US009082301B2

(12) United States Patent
Catalfamo et al.

(10) Patent No.: US 9,082,301 B2
(45) Date of Patent: Jul. 14, 2015

(54) AIRCRAFT STOPPING PERFORMANCE DISPLAY AND WARNING

(71) Applicant: The Boeing Company, Chicago, IL (US)

(72) Inventors: Michael Gian Catalfamo, Seattle, WA (US); Jean Marie Crane, Seattle, WA (US); Marisa R. Jenkins, Seattle, WA (US); John David Anderson, Auburn, WA (US); Thomas Todd Griffith, Seattle, WA (US); Bechara J. Mallouk, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 47 days.

(21) Appl. No.: 14/064,804

(22) Filed: Oct. 28, 2013

(65) Prior Publication Data

US 2015/0120098 A1 Apr. 30, 2015

(51) Int. Cl.

| | |
|---|---|
| ***G06F 19/00*** | (2011.01) |
| ***G06G 7/70*** | (2006.01) |
| ***G08G 5/02*** | (2006.01) |
| *G05D 3/00* | (2006.01) |
| *G05D 1/00* | (2006.01) |
| *G01C 5/00* | (2006.01) |
| *G08B 21/00* | (2006.01) |
| *G08G 5/00* | (2006.01) |

(52) U.S. Cl.
CPC .................................... *G08G 5/02* (2013.01)

(58) Field of Classification Search
USPC ................................................ 340/900–999
See application file for complete search history.

(56) References Cited

U.S. PATENT DOCUMENTS

| | | | | |
|---|---|---|---|---|
| 4,316,252 | A | 2/1982 | Cooper | |
| 4,958,512 | A | 9/1990 | Johnson | |
| 5,047,942 | A | 9/1991 | Middleton et al. | |
| 6,978,205 | B2 | 12/2005 | Ryan et al. | |
| 6,991,304 | B2 * | 1/2006 | Villaume | 303/126 |
| 7,586,422 | B2 * | 9/2009 | Goodman et al. | 340/945 |
| 7,853,370 | B2 | 12/2010 | Coulmeau et al. | |
| 7,916,042 | B2 * | 3/2011 | Constans | 340/945 |
| 8,060,261 | B2 | 11/2011 | Goodman et al. | |
| 8,116,989 | B2 * | 2/2012 | Journade et al. | 702/34 |
| 8,209,072 | B2 | 6/2012 | Villaume et al. | |
| 8,244,444 | B2 | 8/2012 | Rado | |
| 2009/0048724 | A1 * | 2/2009 | Caule | 701/16 |

(Continued)

OTHER PUBLICATIONS

"Airbus' Runway Overrun Prevention System (ROPS) certified on A320ceo Family," Aibus S.A.S., Press Release, Aug. 2013, 2 pages, accessed Oct. 28, 2013. http://www.airbus.com/presscentre/pressreleases/press-release-detail/detail/airbus-runway-overrun-prevention-system-rops-certified-on-a320ce0-family/.

*Primary Examiner* — Thomas Tarcza
*Assistant Examiner* — Timothy Nesley
(74) *Attorney, Agent, or Firm* — Yee & Associates, P.C.

(57) ABSTRACT

A system and method for determining a predicted stopping performance of an aircraft moving on a runway. A predicted stopping force acting on the aircraft to stop the aircraft is determined by a processor unit as the aircraft is moving on the runway. A predicted deceleration of the aircraft moving on the runway is determined by the processor unit using the predicted stopping force acting on the aircraft to stop the aircraft. The predicted stopping performance of the aircraft on the runway is determined by the processor unit using the predicted deceleration of the aircraft.

20 Claims, 14 Drawing Sheets

(56) References Cited

U.S. PATENT DOCUMENTS

2011/0166723 A1* 7/2011 Valentova et al. .............. 701/16
2013/0261855 A1* 10/2013 DeGagne et al. ............... 701/16
2013/0261920 A1* 10/2013 Picaut et al. .................... 701/70
2014/0257603 A1* 9/2014 McKeown et al. .............. 701/16

* cited by examiner

AIRCRAFT STOPPING PERFORMANCE DISPLAY AND WARNING

BACKGROUND INFORMATION

1. Field

The present disclosure relates generally to the capability of an aircraft moving on a runway to slow down and come to a stop. More particularly, the present disclosure relates to a system and method for predicting the stopping position of an aircraft moving on a runway, displaying the predicted stopping position to an operator of the aircraft, and providing a warning when the aircraft is predicted to overrun the runway.

2. Background

An aircraft may be moving at a relatively fast speed immediately after landing on a runway. Such a fast moving aircraft must be slowed down in order for the aircraft to exit the runway safely via a taxiway. More importantly, the aircraft must be slowed down at a sufficient rate so that the aircraft may be brought to a stop or exit the runway safely via a taxiway before the aircraft overruns the end of the runway.

A pilot or other operator of an aircraft may control various systems on the aircraft to slow down and stop an aircraft moving on a runway. Aircraft systems that may be used for bringing a moving aircraft to a stop on a runway may include an aircraft braking system, the aircraft thrust system, and the aerodynamic system of the aircraft. The aircraft braking system may be controlled by the pilot or automatically to slow the rotation of the aircraft wheels as the wheels roll on the runway. The aircraft thrust system may be controlled to slow the aircraft by controlling the aircraft engines to provide thrust in an appropriate direction to slow the movement of the aircraft. The aerodynamic system of the aircraft may include, for example, a speed brake, flaps, other systems, or various combinations of systems that may be controlled to change the aerodynamic characteristics of the aircraft. The aerodynamic system of the aircraft may be controlled to slow the aircraft by increasing drag and lift reduction to destroy the lift of the wing of the aircraft as it moves on the runway.

The capability of the various systems on an aircraft to slow down and stop the aircraft moving on a runway may depend on various conditions. For example, the condition of the runway may affect the ability of the aircraft braking system to stop the aircraft. The ability of the aircraft braking system to stop an aircraft moving on a runway is reduced when the force of friction between the wheels of the aircraft and the surface of the runway is reduced. Therefore, for example, the capability of the braking system on an aircraft to stop the aircraft moving on a runway may be reduced when the runway is icy or wet.

A pilot or other operator of an aircraft may rely on experience, a judgment of runway conditions, and a judgment of the capability of various aircraft systems to stop the aircraft under such conditions, to control the various systems on the aircraft to stop the aircraft moving on the runway. The pilot may be provided with information from various sources that may help the pilot to judge the current condition of the runway. For example, the pilot may be provided with data from airport friction measuring devices, weather reports, or other information that may help the pilot to judge the current condition of the runway prior to landing. However, even with the availability of such information, a pilot may not always be able to judge accurately either the current runway condition or the effects of the current runway condition on aircraft stopping performance. For example, runway conditions may change relatively quickly.

Therefore, a pilot or other operator of an aircraft may not be able to rely on experience and reported condition alone to stop an aircraft moving on a runway effectively under all conditions and to prevent the aircraft from overrunning the end of the runway. Experience and judgment alone may not be sufficient for a pilot or other operator of an aircraft to control various systems on the aircraft to stop the aircraft moving on a runway in an effective manner. For example, a pilot may not be able to judge accurately the condition of the runway and the effect of the runway condition on the operation of the braking system on the aircraft. As a result, the pilot may not be able to discern accurately the current deceleration of the aircraft or whether the current deceleration will slow the aircraft enough to exit the runway safely via a desired taxiway or to stop before overrunning the runway.

Automated systems for determining a predicted stopping position of an aircraft moving on a runway have been developed. Such systems may provide an indication of the predicted stopping position of the aircraft to the pilot or other operator of the aircraft. Such systems also may provide an audible warning or other warning when the predicted stopping position of the aircraft indicates that the aircraft may overrun the runway.

Current automated systems for indicating a predicted stopping position of an aircraft moving on a runway and for providing overrun warnings may have several limitations. For example, current automated systems may not be able to predict the stopping position of the aircraft accurately for various runway conditions and operating conditions of the various aircraft systems that may be used to stop an aircraft moving on a runway. Therefore, current systems may provide an inaccurate indication of the predicted stopping position of the aircraft and incorrect warnings for when the aircraft is predicted to overrun the runway in some cases. For example, such systems may provide inappropriate overrun warnings in many cases where it is likely that the aircraft will stop in time or be able to exit the runway safely via a taxiway before overrunning the runway.

Therefore, it would be desirable to have a method and apparatus that take into account at least some of the issues discussed above, as well as other possible issues.

SUMMARY

Illustrative embodiments of the present disclosure provide a method for determining a predicted stopping performance of an aircraft moving on a runway. A predicted stopping force acting on the aircraft to stop the aircraft is determined by a processor unit as the aircraft is moving on the runway. A predicted deceleration of the aircraft moving on the runway is determined by the processor unit using the predicted stopping force acting on the aircraft to stop the aircraft. The predicted stopping performance of the aircraft on the runway is determined by the processor unit using the predicted deceleration of the aircraft.

Illustrative embodiments of the present disclosure also provide a method for displaying a predicted stopping position of an aircraft moving on a runway. A current position of the aircraft on the runway is identified by a processor unit. A current speed of the aircraft on the runway is identified by the processor unit. A predicted deceleration of the aircraft moving on the runway is determined by the processor unit. The predicted stopping position of the aircraft with respect to the runway is determined by the processor unit using the current position of the aircraft, the current speed of the aircraft, and the predicted deceleration of the aircraft. A planned stopping performance for the aircraft with respect to the runway is identified. An indication of the predicted stopping position of the aircraft and an indication of the planned stopping performance for the aircraft are displayed at the same time with respect to a representation of the runway.

Illustrative embodiments of the present disclosure also provide an apparatus comprising a stopping force predictor, a deceleration predictor, and a stopping performance predictor. The stopping force predictor is configured to determine a predicted stopping force acting on an aircraft to stop the aircraft as the aircraft is moving on a runway. The deceleration predictor is configured to determine a predicted deceleration of the aircraft moving on the runway using the predicted stopping force acting on the aircraft to stop the aircraft. The stopping performance predictor is configured to determine a predicted stopping performance of the aircraft on the runway using the predicted deceleration of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
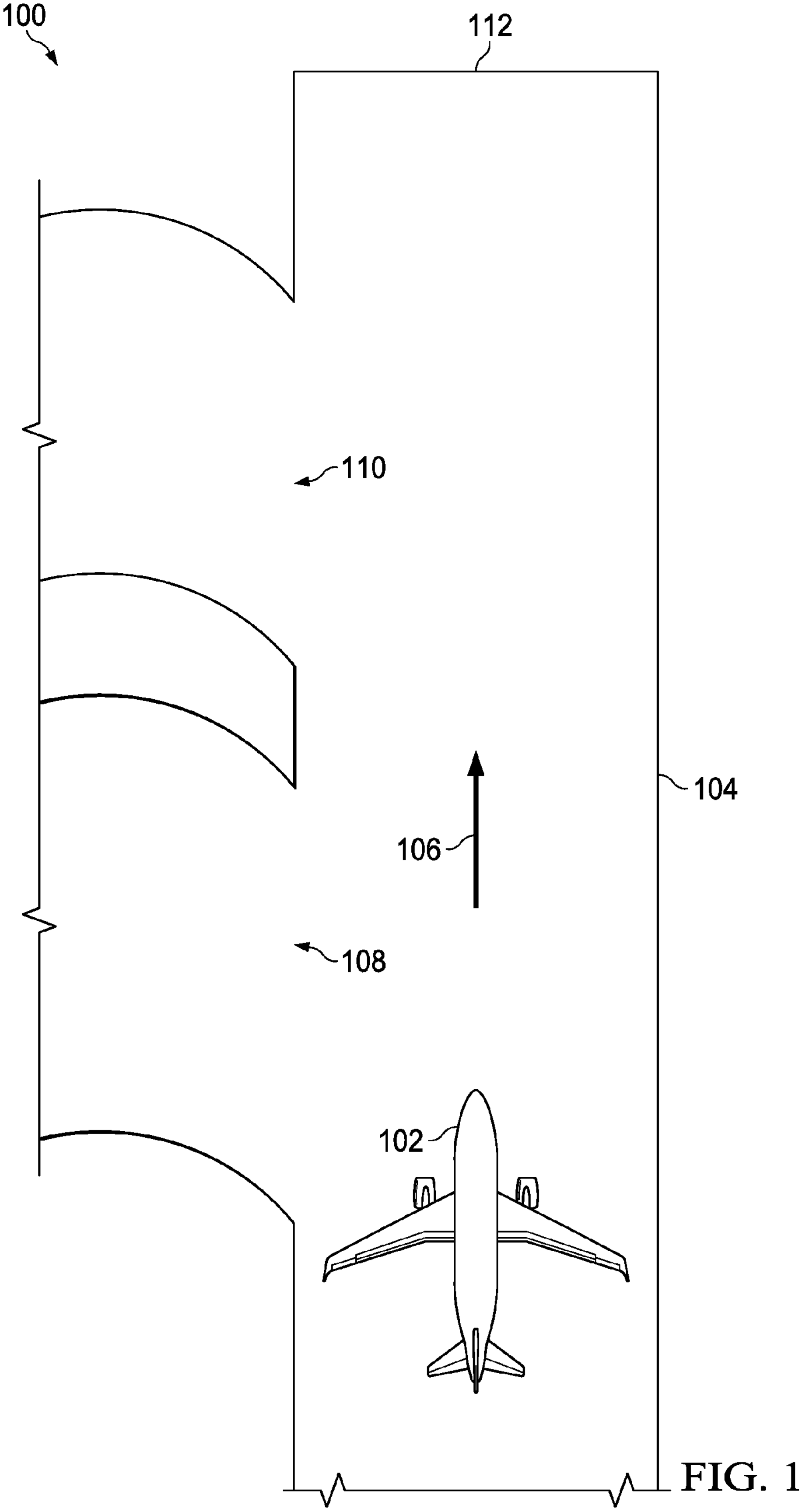
FIG. 1 is an illustration of an aircraft operating environment in accordance with an illustrative embodiment.

The different illustrative embodiments recognize and take into account a number of different considerations. "A number of," as used herein with reference to items, means one or more items. For example, "a number of different considerations" means one or more different considerations.

The different illustrative embodiments recognize and take into account that it is desirable for a pilot or other operator of an aircraft to be able to control various systems on an aircraft in an effective manner to bring an aircraft moving on a runway to a stop before the aircraft overruns the runway. It also may be desirable for the pilot or other operator to be able to control the various systems on the aircraft in an effective manner to slow the aircraft sufficiently for the aircraft to exit the runway safely via a desired taxiway. For example, the efficiency of air traffic operations at an airport and of airline operations may be improved when aircraft are able to exit a runway quickly via a desired taxiway or to exit the runway via a desired taxiway that is close to a gate at which the aircraft is to be parked. In any case, more effective control of the various systems on an aircraft to slow down an aircraft moving on a runway under various runway conditions or other operating conditions is desirable.

The different illustrative embodiments recognize and take into account that an aircraft overrunning a runway may be avoided if the pilot or other operator of the aircraft has an accurate awareness of actual runway conditions and is able to identify the effect of runway conditions during a landing rollout. The different illustrative embodiments recognize and take into account that there currently may be no real time or direct means to determine the actual runway condition and alert a pilot or other operator when conditions become adverse enough so that normal stopping procedures need to be modified in order to prevent a runway overrun. Similarly, normal stopping procedures may need to be modified to prevent a runway overrun when an aircraft is moving on a runway at a higher than anticipated speed, when the amount of runway remaining after landing is less than expected, or in other adverse conditions.

The different illustrative embodiments recognize and take into account that an automated system may be configured to predict a stopping position for an aircraft moving on a runway, to display an indication of the predicted stopping position to the pilot or other operator of the aircraft, and to provide an audible warning or other warning to the pilot or other operator when the predicted stopping position for the aircraft indicates that the aircraft may overrun the runway. The overrun warning provided by such a system may alert the pilot or other operator of the aircraft to take appropriate action to prevent the aircraft overrunning the end of the runway.

The different illustrative embodiments recognize and take into account that current automated systems may not be able to predict the stopping position of an aircraft accurately for various runway conditions and operating conditions of the various aircraft systems that may be used to stop an aircraft moving on a runway. For example, current automated systems may provide an overrun warning only when an automatic braking system on the aircraft is used to stop the aircraft moving on a runway. The illustrative embodiments also recognize and take into account, however, that an automatic braking system may not always be used to stop an aircraft moving on a runway or may be used for only a portion of the aircraft rollout.

The different illustrative embodiments also recognize and take into account that current automated systems may use only the identified instantaneous deceleration of an aircraft to predict the stopping position of the aircraft moving on a runway. For this and other reasons, current automated systems may provide an inaccurate indication of the predicted stopping position of the aircraft and incorrect warnings for when the aircraft is predicted to overrun the runway in some cases. The different illustrative embodiments recognize and take into account that such systems may provide unnecessary overrun warnings. For example, such systems may provide inappropriate overrun warnings in many cases where it is likely that the aircraft will stop in time or be able to exit the runway safely via a taxiway before overrunning the runway.

The different illustrative embodiments recognize and take into account that inappropriate audible warnings or other overrun warnings in situations where an overrun is not likely may be distracting and annoying to the pilot or other operator of an aircraft, and may degrade trust in the system. Such warnings may be referred to as nuisance warnings.

The illustrative embodiments provide a pilot or other operator of an aircraft with an accurate awareness of the stopping performance of an aircraft moving on a runway in various operating conditions. The illustrative embodiments thereby provide an accurate indication of the result of the control of various systems on the aircraft by the pilot or other operator to slow down and stop the aircraft. In accordance with an illustrative embodiment, an accurate prediction of the stopping performance of an aircraft may be determined using a real-time estimate of runway conditions as the aircraft moves on the runway.

In accordance with an illustrative embodiment, an accurate predicted stopping position of an aircraft with respect to a runway may be determined in various operating conditions. An indication of the predicted stopping position may be displayed to the pilot or other operator of the aircraft with respect to a representation of the runway. The predicted stopping position display may provide to the pilot or other operator an accurate indication of the current deceleration of the aircraft and of where the speed of the aircraft may be reduced sufficiently to safely exit the runway. The predicted stopping position display may help the pilot or other operator to control various systems for stopping the aircraft in a more effective manner to prevent runway overruns and to safely and efficiently exit the runway via a desired taxiway. This more effective control of the stopping performance of aircraft may result in improved efficiency in air traffic control and airline operations.

The illustrative embodiments also may provide a warning to alert a pilot or other operator of an aircraft moving on a runway when conditions are likely to result in a runway overrun. For example, an overrun warning may be provided when the predicted stopping position for the aircraft is at or beyond the end of the runway. The overrun warning may include audible alerts and visual alerts provided on various displays on the flight deck of the aircraft. Improved accuracy in determining the predicted stopping performance of the aircraft for various operating conditions may reduce or eliminate the number of inaccurate nuisance warnings that are provided.

Turning to FIG. 1, an illustration of an aircraft operating environment is depicted in accordance with an illustrative embodiment. Aircraft operating environment 100 includes aircraft 102 and runway 104. Immediately after landing on runway 104, aircraft 102 may be moving at a relatively high speed in the direction of arrow 106.

In this example, aircraft 102 may exit runway 104 via taxiway 108 or taxiway 110. Aircraft 102 moving on runway 104 must be slowed down sufficiently before aircraft 102 reaches taxiway 108 or taxiway 110 in order for aircraft 102 to turn safely onto taxiway 108 or taxiway 110 to exit runway 104. More importantly, aircraft 102 must be slowed down at a sufficient rate so that aircraft 102 does not overrun end 112 of runway 104.

The flight crew on aircraft 102 may control various systems on aircraft 102 to slow down aircraft 102 moving on runway 104. The ability of the various systems on aircraft 102 to slow down aircraft 102 may depend on various operating conditions. For example, the effectiveness of a braking system on aircraft 102 to slow down aircraft 102 moving on runway 104 may depend on the condition of runway 104. The braking system on aircraft 102 may be controlled to slow down aircraft 102 most effectively when runway 104 is dry. However, the braking system on aircraft 102 may not be able to slow down aircraft 102 as well when runway 104 is wet or icy.

In accordance with an illustrative embodiment, the flight crew on aircraft 102 may be provided with an accurate indication of the stopping performance of aircraft 102 in real-time as aircraft 102 moves on runway 104. Accurate knowledge of the stopping performance of aircraft 102 may help the flight crew to control more effectively the various systems on aircraft 102 that are used to slow down and stop aircraft 102 moving on runway 104. The flight crew may use stopping performance information provided in accordance with an illustrative embodiment to control more effectively the systems on aircraft 102 to slow down aircraft 102 so that aircraft 102 may safely exit runway 104 on a preferred one of taxiway 108 or taxiway 110 and to prevent aircraft 102 from overrunning end 112 of runway 104.

For example, a system and method in accordance with an illustrative embodiment may be configured to determine a predicted stopping performance of aircraft 102 with respect to runway 104 that take into account in real-time the current and changing conditions of runway 104 as aircraft 102 moves on runway 104. An indication of a predicted stopping position of aircraft 102 with respect to runway 104 may be displayed to the flight crew with respect to a representation of runway 104. The predicted stopping performance of aircraft 102 moving on runway 104 also may be used to provide an accurate overrun warning to the flight crew of aircraft 102 when the predicted stopping performance of aircraft 102 indicates that aircraft 102 is likely to overrun end 112 of runway 104.

Figure 2:
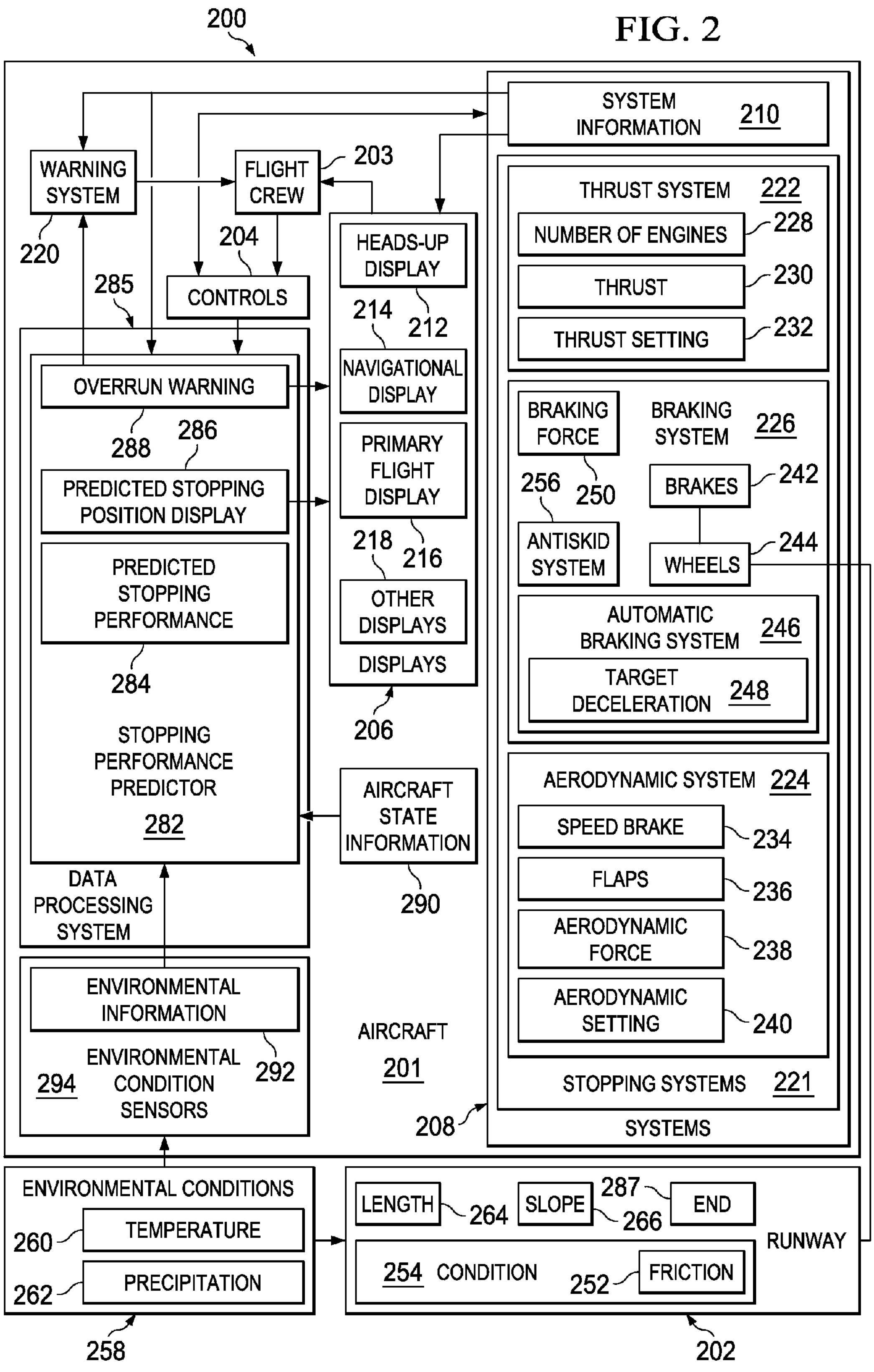
FIG. 2 is an illustration of a block diagram of an aircraft in an aircraft operating environment in accordance with an illustrative embodiment.

Turning to FIG. 2, an illustration of a block diagram of an aircraft in an aircraft operating environment is depicted in accordance with an illustrative embodiment. In this example, aircraft operating environment 200 may be an example of one implementation of aircraft operating environment 100 in FIG. 1. Aircraft operating environment 200 may include aircraft 201 and runway 202.

Aircraft 201 may be any appropriate type of aircraft that may land on runway 202 or take off from runway 202. For example, without limitation, aircraft 201 may be a commercial passenger aircraft, a cargo aircraft, a military aircraft, a private aircraft, an aerospace vehicle configured for operating in the air and in space, or any other appropriate type of aircraft that may be configured for any appropriate purpose or mission. Aircraft 201 may be a manned or unmanned aircraft.

Operation of aircraft 201 may be controlled by flight crew 203. For example, without limitation, flight crew 203 may include a pilot, a copilot, a navigator, or any other person or combination of persons for controlling the operation of aircraft 201. Flight crew 203 may be referred to as the operator of aircraft 201.

Flight crew 203 may use various controls 204 and displays 206 to control the operation of various systems 208 on aircraft 201 in a desired manner. Controls 204 and displays 206 may be located on the flight deck of aircraft 201 or in any other appropriate location. For example, when aircraft 201 is an unmanned aircraft, controls 204 and displays 206 may be located at a remote location that is not on aircraft 201.

Controls 204 may include any appropriate devices that may be configured to receive input from flight crew 203 for controlling systems 208 on aircraft 201. Systems 208 may be configured to respond in an appropriate manner to the input provided by flight crew 203 via controls 204.

Displays 206 may be configured to display system information 210 to flight crew 203. For example, system information 210 may include information indicating the current operating condition or status of systems 208. System information 210 presented on displays 206 thus may provide feedback to flight crew 203 of the response of systems 208 to the input provided by flight crew 203 via controls 204.

Displays 206 may include heads-up display 212, navigational display 214, primary flight display 216, other displays 218, or various combinations of appropriate displays. For example, without limitation, displays 206 may include a number of multi-function displays. Heads-up display 212 may include any transparent display that allows flight crew 203 to view information displayed thereon while looking forward through the windshield of aircraft 201.

Aircraft 201 may include warning system 220. Warning system 220 may be configured to provide audible alerts, visual alerts, or various combinations of alerts in any appropriate manner to draw the attention of flight crew 203. For example, without limitation, warning system 220 may be configured to provide such alerts in response to system information 210 indicating that important action should be taken by flight crew 203 in a timely manner.

Systems 208 on aircraft 201 may include various stopping systems 221. Stopping systems 221 may include any appropriate systems on aircraft 201 that may be used to slow down and stop aircraft 201 moving on runway 202. For example, without limitation, stopping systems 221 may include thrust system 222, aerodynamic system 224, and braking system 226.

Thrust system 222 may include any appropriate number of engines 228 for aircraft 201. Number of engines 228 may be controlled in an appropriate manner to provide thrust 230. Thrust 230 refers to the force provided by number of engines 228 to accelerate aircraft 201. For example, without limitation, when thrust system 222 is used to stop aircraft 201 moving on runway 202, number of engines 228 may be controlled in an appropriate manner to provide thrust 230 in an appropriate direction to oppose to the direction of movement of aircraft 201, thereby to decelerate aircraft 201. The amount and direction of thrust 230 provided by number of engines 228 may be defined by thrust setting 232. Flight crew 203 may control thrust setting 232 by appropriate use of appropriate controls 204 for thrust system 222. Thrust system 222 may be configured to produce an appropriate amount of thrust 230 in an appropriate direction in response to thrust setting 232 established by flight crew 203 using appropriate controls 204.

Aerodynamic system 224 may include various surfaces on aircraft 201 that may be controlled to affect the interaction of aircraft 201 with the air around it. For example, without limitation, aerodynamic system 224 may include speed brake 234, flaps 236, or any other flight control surface or combination of surfaces on aircraft 201 that may be controlled to control the aerodynamic performance of aircraft 201. Speed brake 234 may include any appropriate structure that may be configured to increase the drag, also referred to as air resistance, of aircraft 201 when speed brake 234 is deployed. Speed brake 234 also may be referred to as an air brake.

Aerodynamic system 224 may be configured in an appropriate manner to control aerodynamic force 238 when aircraft 201 is moving on runway 202. In this application, including in the claims, aerodynamic force 238 refers to the force provided by the interaction of aircraft 201 with the air around it to stop aircraft 201 moving on runway 202. In other words, aerodynamic force 238 may refer to the aerodynamic resistance to movement of aircraft 201 on runway 202. The configuration of aerodynamic system 224 may be defined by aerodynamic setting 240. Flight crew 203 may control aerodynamic setting 240 by appropriate use of appropriate controls 204 for aerodynamic system 224.

Braking system 226 may include brakes 242. Brakes 242 may be configured to be controlled to engage wheels 244 of aircraft 201 to slow down and stop the rotation of wheels 244 when aircraft 201 is moving on runway 202. Braking system 226 may be controlled manually by flight crew 203. For example, flight crew 203 may control braking system 226 to apply brakes 242 to wheels 244 by appropriate use of appropriate controls 204 for braking system 226. Braking system 226 also may be controlled by automatic braking system 246. For example, flight crew 203 may activate automatic braking system 246 and deactivate automatic braking system 246 using appropriate controls 204 for turning automatic braking system 246 on and off. When automatic braking system 246 is turned on and active, automatic braking system 246 may automatically control brakes 242 to maintain an appropriate target deceleration 248 for aircraft 201 moving on runway 202. When automatic braking system 246 is turned off or not active, braking system 226 may be controlled manually by flight crew 203 using appropriate controls 204 for braking system 226.

In the present application, including in the claims, braking force 250 refers to the force provided by braking system 226 to stop aircraft 201 moving on runway 202. Braking force 250 may be affected both by the operation of braking system 226 and by the amount of friction 252 between the surface of runway 202 and wheels 244 of aircraft 201 when aircraft 201 is moving on runway 202. The amount of friction 252 between wheels 244 and runway 202 may be affected by condition 254 of the surface of runway 202. Condition 254 of runway 202 may refer to any condition or state of runway 202, or any combination of conditions or states of runway 202, which may affect friction 252 between runway 202 and wheels 244 of aircraft 201. For example, without limitation, friction 252 may be relatively higher when condition 254 of runway 202 is dry. Friction 252 may be relatively lower when condition 254 of runway 202 is icy.

In some situations, friction 252 between runway 202 and wheels 244 of aircraft 201 may be sufficiently low such that increasing the braking of wheels 244 by brakes 242 does not increase braking force 250 to stop aircraft 201 moving on runway 202. For example, without limitation, such a situation may occur when condition 254 of runway 202 is icy. In such a case, the available braking force 250 may be limited by the amount of available friction 252. Therefore, such a condition 254 may be referred to as a friction-limited condition. Fully applying braking to wheels 244 by brakes 242 in such a friction-limited condition may cause brakes 242 to lock up, resulting in non-rotating wheels 244 of aircraft 201 sliding on the surface of runway 202. The locking up of brakes 242 and wheels 244 in this manner may cause aircraft 201 to skid on runway 202 in an unpredictable manner that may be difficult or impossible to control.

Braking system 226 may include antiskid system 256. Antiskid system 256 may be configured to prevent the undesirable skidding of aircraft 201 on runway 202 when condition 254 of runway 202 provides relatively very low friction 252. For example, without limitation, antiskid system 256 may be configured to regulate the operation of brakes 242 to prevent the lockup of wheels 244 and skidding of aircraft 201 on runway 202. Antiskid system 256 may be configured to reduce the braking applied either manually by flight crew 203 or automatically by automatic braking system 246 in an appropriate manner to prevent lockup of wheels 244 and skidding of aircraft 201 on runway 202 in friction-limited conditions. Antiskid system 256 may be configured to operate automatically to prevent skidding of aircraft 201 on runway 202 whenever friction-limited conditions are identified. Therefore, friction-limited conditions also may be referred to as antiskid-limited conditions.

Condition 254 of runway 202 may be affected by environmental conditions 258 in the area of runway 202. Temperature 260 of the air and precipitation 262 in the area of runway 202 are examples, without limitation, of environmental conditions 258 that may affect condition 254 of runway 202. Other environmental conditions 258, or various combinations of environmental conditions 258, also may affect condition 254 of runway 202.

Runway 202 may comprise any appropriate surface on which aircraft 201 may be moving immediately after landing or immediately before takeoff. Runway 202 may have any appropriate length 264 for landing aircraft 201 thereon. Runway 202 may have any appropriate slope 266. For example, without limitation, slope 266 of runway 202 may be defined with respect to level or horizontal of a number of points on the runway. Slope 266 of runway 202 may be constant or may vary along length 264 of runway 202.

In accordance with an illustrative embodiment, stopping performance predictor 282 may be configured to determine predicted stopping performance 284 of aircraft 201 in real-time as aircraft 201 moves on runway 202. For example, without limitation, various functions performed by stopping performance predictor 282 as described herein may be implemented in hardware or in software in combination with hardware on any appropriate data processing system 285. Data processing system 285 may be located on aircraft 201. Alternatively, some or all of the functions performed by stopping performance predictor 282 may be implemented in data processing system 285 that may not be located on aircraft 201.

Predicted stopping performance 284 may identify the effects of the control of stopping systems 221 and condition 254 of runway 202 on slowing down and stopping aircraft 201 moving on runway 202. For example, without limitation, predicted stopping performance 284 may identify a predicted stopping position of aircraft 201 with respect to runway 202. An indication of the predicted stopping position of aircraft 201 may be displayed to flight crew 203 as part of predicted stopping position display 286. Predicted stopping position display 286 may be configured to display the indication of the predicted stopping position of aircraft 201 to flight crew 203 in an appropriate manner to help flight crew 203 to control stopping systems 221 to slow down and stop aircraft 201 moving on runway 202 in a more effective manner. For example, predicted stopping position display 286 may comprise a graphical indication of the predicted stopping position of aircraft 201 displayed with respect to a graphical representation of runway 202. For example, without limitation, predicted stopping position display 286 may be provided to flight crew 203 on an appropriate one or more of displays 206.

Alternatively, or in addition, predicted stopping performance 284 may indicate that aircraft 201 moving on runway 202 is likely to overrun end 287 of runway 202. For example, without limitation, end 287 of runway 202 may comprise the physical end of runway 202. Alternatively, end 287 of runway 202 may refer to the end of the portion of runway 202 beyond which it is not desirable for aircraft 201 to be brought to a stop.

Overrun warning 288 may be provided in response to a determination using predicted stopping performance 284 that aircraft 201 moving on runway 202 is likely to overrun end 287 of runway 202. For example, without limitation, overrun warning 288 may comprise any appropriate audible alerts, visual alerts, other alerts, or various combinations of alerts for warning flight crew 203 that aircraft 201 is likely to overrun end 287 of runway 202. Overrun warning 288 may be provided to flight crew 203 via warning system 220. Alternatively, or in addition, overrun warning 288 may be provided to flight crew 203 on an appropriate one or more of displays 206. For example, without limitation, overrun warning 288 may be provided as part of predicted stopping position display 286 on one or more of displays 206. In any case, overrun warning 288 may be provided to flight crew 203 in any appropriate manner such that flight crew 203 may respond to overrun warning 288 by taking appropriate action to prevent aircraft 201 from overrunning end 287 of runway 202.

In accordance with an illustrative embodiment, predicted stopping performance 284 may be determined in an accurate manner such that the predicted stopping position of aircraft 201 indicated in predicted stopping position display 286 is accurate. Furthermore, predicted stopping performance 284 may be determined in an accurate manner such that inaccurate nuisance warnings that aircraft 201 is likely to overrun runway 202 are reduced or eliminated. In accordance with an illustrative embodiment, stopping performance predictor 282 may be configured to determine predicted stopping performance 284 in an accurate manner by taking into account the forces provided by stopping systems 221 to stop aircraft 201 moving on runway 202 for condition 254 of runway 202.

Stopping performance predictor 282 may be configured to use various types of information from various sources to determine predicted stopping performance 284 for aircraft 201. For example, without limitation, stopping performance predictor 282 may be configured to use various combinations of information provided by flight crew 203, system information 210 for systems 208 on aircraft 201, aircraft state information 290, environmental information 292, and other appropriate information to determine predicted stopping performance 284 accurately.

For example, without limitation, information provided by flight crew 203 to stopping performance predictor 282 may include operator input provided via appropriate controls 204. System information 210 provided to stopping performance predictor 282 may include information indicating the operating status of stopping systems 221 and information from other appropriate systems 208 on aircraft 201.

Aircraft state information 290 provided to stopping performance predictor 282 may include information indicating the current state or condition of aircraft 201. For example, without limitation, aircraft state information 290 may include information indicating the current geographical position, speed, acceleration, pitch attitude, weight or mass, altitude, or other state or condition or various combinations of states or conditions of aircraft 201. Aircraft state information 290 may be provided by various appropriate systems 208 on aircraft 201.

Environmental information 292 may include information identifying environmental conditions 258 at runway 202. For example, without limitation, environmental information 292 may be provided by appropriate environmental condition sensors 294. Environmental conditions sensors 294 may or may not be located on aircraft 201. Alternatively, or in addition, environmental information 292 may be provided indirectly by other appropriate systems 208 on aircraft 201. For example, without limitation, precipitation 262 in the area of runway 202 may be identified when a windshield wiper system on aircraft 201 moving on runway 202 is turned on.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, illustrative embodiments are described herein with reference to slowing down and stopping aircraft 201 after aircraft 201 lands on runway 202. However, illustrative embodiments may have application in any situation where it is desirable to slow down and stop aircraft 201 moving on runway 202 at a relatively high speed. For example, without limitation, illustrative embodiments may be applicable in rejected takeoff situations. A rejected takeoff is a situation in which it is decided to abort the takeoff of aircraft 201 after aircraft 201 has started moving on runway 202 for the takeoff roll. Predicted stopping position display 286 may provide an indication to flight crew 203 of whether or not predicted stopping performance 284 of aircraft 201 is sufficient to stop aircraft 201 before aircraft 201 reaches end 287 of runway 202 following a rejected takeoff. Overrun warning 288 may alert flight crew 203 to take appropriate action when predicted stopping performance 284 indicates that aircraft 201 is likely to overrun end 287 of runway 202 following a rejected takeoff.

Figure 3:
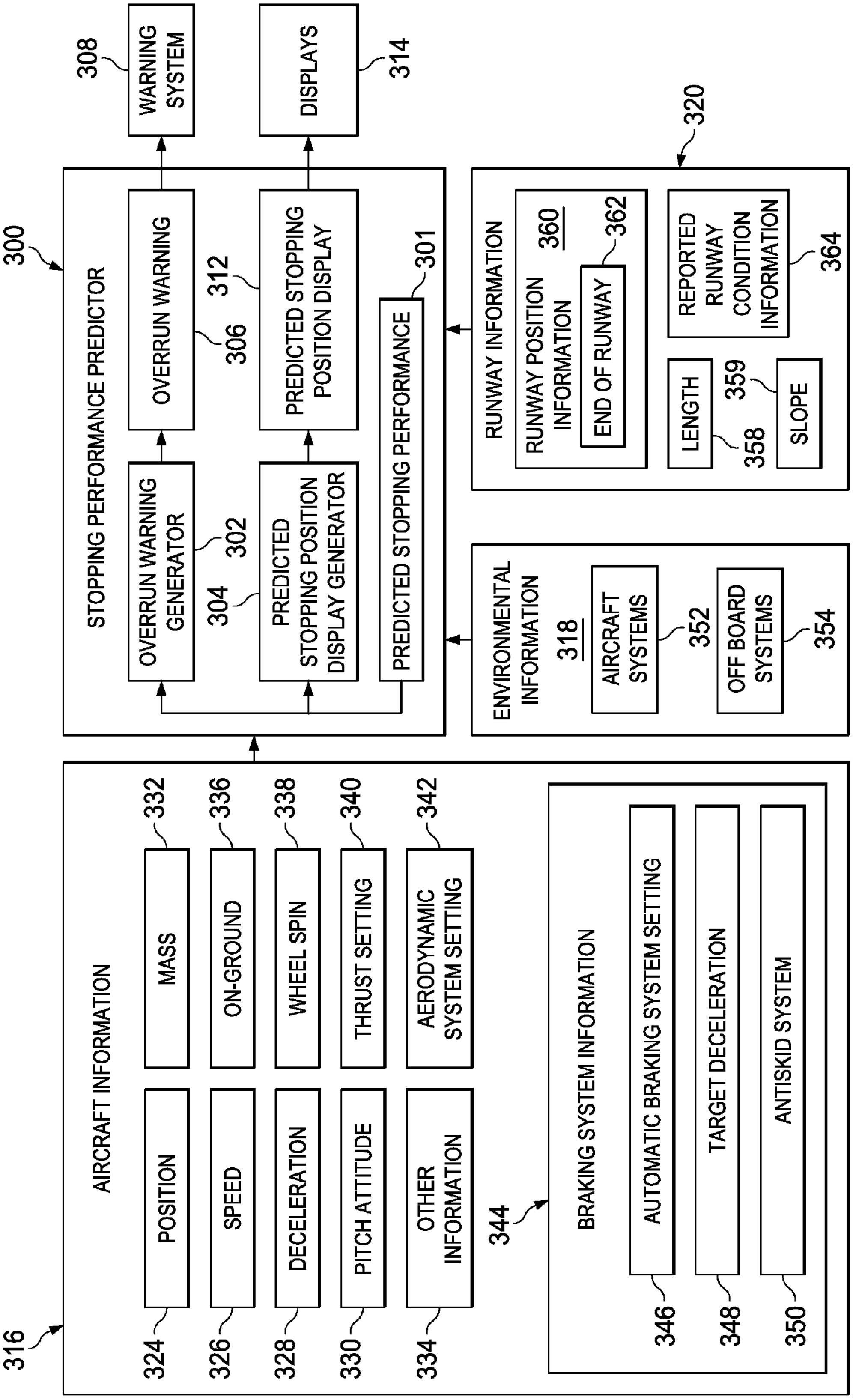
FIG. 3 is an illustration of a block diagram of information used by and output provided by a stopping performance predictor for an aircraft in accordance with an illustrative embodiment.

Turning to FIG. 3, an illustration of a block diagram of information used by and output provided by a stopping performance predictor for an aircraft is depicted in accordance with an illustrative embodiment. In this example, stopping performance predictor 300 may be an example of one implementation of stopping performance predictor 282 in FIG. 2.

Stopping performance predictor 300 may be configured to determine predicted stopping performance 301 for an aircraft. Predicted stopping performance 301 may identify the ability of the aircraft moving on a runway to be brought to a stop based on the condition of the runway and the control of various systems on the aircraft to stop the aircraft. Predicted stopping performance 301 may be provided to one or both of overrun warning generator 302 and predicted stopping position display generator 304 to provide one or more indications of predicted stopping performance 301 to an operator of the aircraft.

Overrun warning generator 302 may be configured to generate overrun warning 306 when predicted stopping performance 301 for an aircraft indicates that the aircraft is likely to overrun the runway or otherwise be brought to a stop at an undesired position for stopping the aircraft with respect to the runway. For example, without limitation, overrun warning 306 may comprise any appropriate audible alerts, visual alerts, other alerts, or various combinations of alerts for warning the operator of the aircraft that the aircraft is likely to overrun the runway. For example, without limitation, overrun warning 306 may be provided to the operator of the aircraft via an appropriate warning system 308.

Predicted stopping position display generator 304 may be configured to use predicted stopping performance 301 to generate predicted stopping position display 312. For example, without limitation, predicted stopping performance 301 may indicate a predicted stopping position of an aircraft with respect to a runway on which the aircraft is moving. Predicted stopping position display 312 may be configured to provide an indication of the predicted stopping position of the aircraft with respect to the runway to an operator of the aircraft. For example, without limitation, predicted stopping position display 312 may be displayed to the operator of the aircraft on one or more appropriate displays 314.

Stopping performance predictor 300 may use various types of information from various sources to determine predicted stopping performance 301 for an aircraft. For example, without limitation, stopping performance predictor 300 may use aircraft information 316, environmental information 318, runway information 320, other information, or various combinations of such information to determine predicted stopping performance 301 accurately.

Aircraft information 316 may include information identifying the state or condition of an aircraft, the state or condition of various systems on the aircraft, or both. For example, without limitation, aircraft information 316 may include position 324 of the aircraft, speed 326 of the aircraft, deceleration 328 of the aircraft, pitch attitude 330 of the aircraft, mass 332 of the aircraft, other information 334 identifying the state or condition of the aircraft, or various combinations of such information.

Position 324 of the aircraft may refer to the current geographical location of the aircraft on the surface of the earth. For example, without limitation, position 324 of the aircraft may be determined using a space-based satellite navigation system, such as the Global Positioning System, GPS, or in any other appropriate manner. Speed 326 of the aircraft may refer to the magnitude of the current velocity of the aircraft with respect to a runway on which the aircraft is moving. For example, without limitation, speed 326 of the aircraft may be determined from the change in position 324 of the aircraft or in any other appropriate manner.

Deceleration 328 of the aircraft may refer to the current rate of reduction of speed 326 of the aircraft as the aircraft moving on the runway is slowed and brought to a stop. Deceleration 328 also may be referred to as acceleration with a negative value. Deceleration 328 may be determined from the change in speed 326 of the aircraft or in any other appropriate manner. The identification of deceleration 328 of an aircraft may be filtered to prevent sudden changes in the identified current value of deceleration 328 over time. For example, without limitation, changes in the identified current deceleration 328 of an aircraft may be smoothed by taking the average of an appropriate number of deceleration samples over time to identify the current deceleration 328 of the aircraft.

Pitch attitude 330 also may be referred to as the angle of attack of the aircraft. Mass 332 of the aircraft may be used to determine the weight of the aircraft in a known manner, and vice versa. For example, without limitation, mass 332 of the aircraft may be determined from the gross weight of the aircraft provided by a flight management computer on the aircraft and the acceleration of gravity, or in any other appropriate manner.

Aircraft information 316 also may include information indicating whether the aircraft is on-ground 336, information identifying wheel spin 338 for the wheels of the aircraft, or both. Aircraft information also may include information identifying thrust setting 340 for a thrust system for the aircraft and information identifying aerodynamic system setting 342 for an aircraft aerodynamic system.

Aircraft information 316 also may include braking system information 344. Braking system information 344 may identify the state of operation of the braking system on the aircraft, one or more characteristics of the braking system on the aircraft, or both. For example, without limitation, braking system information 344 may include information identifying automatic braking system setting 346, target deceleration 348, and antiskid system 350. Information identifying automatic braking system setting 346 may indicate whether or not an automatic braking system on the aircraft is turned on and active. Target deceleration 348 may be used by the automatic braking system on the aircraft to control the aircraft braking system. When the automatic braking system on the aircraft is turned on and active, the automatic braking system may automatically control the aircraft braking system to maintain target deceleration 348 for the aircraft. Information for antiskid system 350 may identify when antiskid system 350 in the braking system on the aircraft is activated to regulate control of the braking system to prevent the brakes and wheels of the aircraft from locking up in friction-limited conditions.

Environmental information 318 may include information identifying various environmental conditions in the area of a runway on which an aircraft is moving. For example, without limitation, environmental information 318 may include information identifying the temperature of the air in the area of the runway, information identifying precipitation in the area of the runway, or information identifying other environmental conditions or various combinations of environmental conditions in the area of the runway.

Environmental information 318 may be provided by aircraft systems 352, by off board systems 354, or by both aircraft systems 352 and off board systems 354. Aircraft systems 352 may include various systems on an aircraft that may be configured to provide environmental information 318. For example, without limitation, aircraft systems 352 may include weather radar on the aircraft, a windshield wiper system on the aircraft, various other systems or sensors on the aircraft, or various combinations of systems and sensors on the aircraft that may be configured to provide environmental information 318. For example, the windshield wiper system on an aircraft may indicate the presence of precipitation when the windshield wipers on the aircraft are turned on. Off board systems 354 may include various systems configured to provide environmental information 318 that are not located on the aircraft. For example, without limitation, off board systems 354 may include airport weather sensors, weather reporting services or systems, mathematical models of environmental conditions, various other systems or sensors that are not located on the aircraft, or various combinations of systems and sensors that are not located on the aircraft and that may be configured to provide environmental information 318.

Runway information 320 may include information identifying various characteristics of the runway on which an aircraft is moving when predicted stopping performance 301 for the aircraft is determined. For example, without limitation, a pilot or other operator of an aircraft may identify the runway on which an aircraft is landing using a flight management computer on the aircraft or in any other appropriate manner. Alternatively, the runway on which an aircraft is moving may be identified automatically. In either case, runway information 320 for the identified runway may be retrieved or obtained by stopping performance predictor 300 in any appropriate manner. For example, runway information 320 may be stored in an appropriate database that may be accessed by stopping performance predictor 300 or may be provided or made available to stopping performance predictor 300 in any other appropriate manner.

For example, without limitation, runway information 320 may include information identifying length 358 of the runway, information identifying slope 359 of the runway, runway position information 360, information identifying other characteristics of the runway, or information identifying various combinations of characteristics of the runway. For example, without limitation, information identifying slope 359 of the runway may include information identifying slope 359 with respect to level or horizontal of a number of points on the runway.

Runway position information 360 may include information identifying the geographical location of the runway. For example, without limitation, runway position information 360 may include information identifying the geographical positions of various points that may define the geographical position of the runway. Runway position information 360 may include information identifying the position of end of runway 362. End of runway 362 may be the physical end of the runway or a position with respect to the runway beyond which an aircraft moving on the runway should not be brought to a stop. In other words, the position of end of runway 362 may identify the position of a boundary between positions on the runway at which it may be desirable to bring an aircraft moving on the runway to a stop and undesirable positions for stopping the aircraft with respect to the runway.

Runway information 320 may include reported runway condition information 364. Reported runway condition information 364 may include any appropriate information identifying the condition of a runway on which an aircraft is moving. Reported runway condition information 364 may be provided for use by stopping performance predictor 300 from any appropriate source and in any appropriate manner. For example, without limitation, reported runway condition information 364 may be provided via operator input, a digital uplink from an airport, or in any other appropriate manner.

Figure 4:
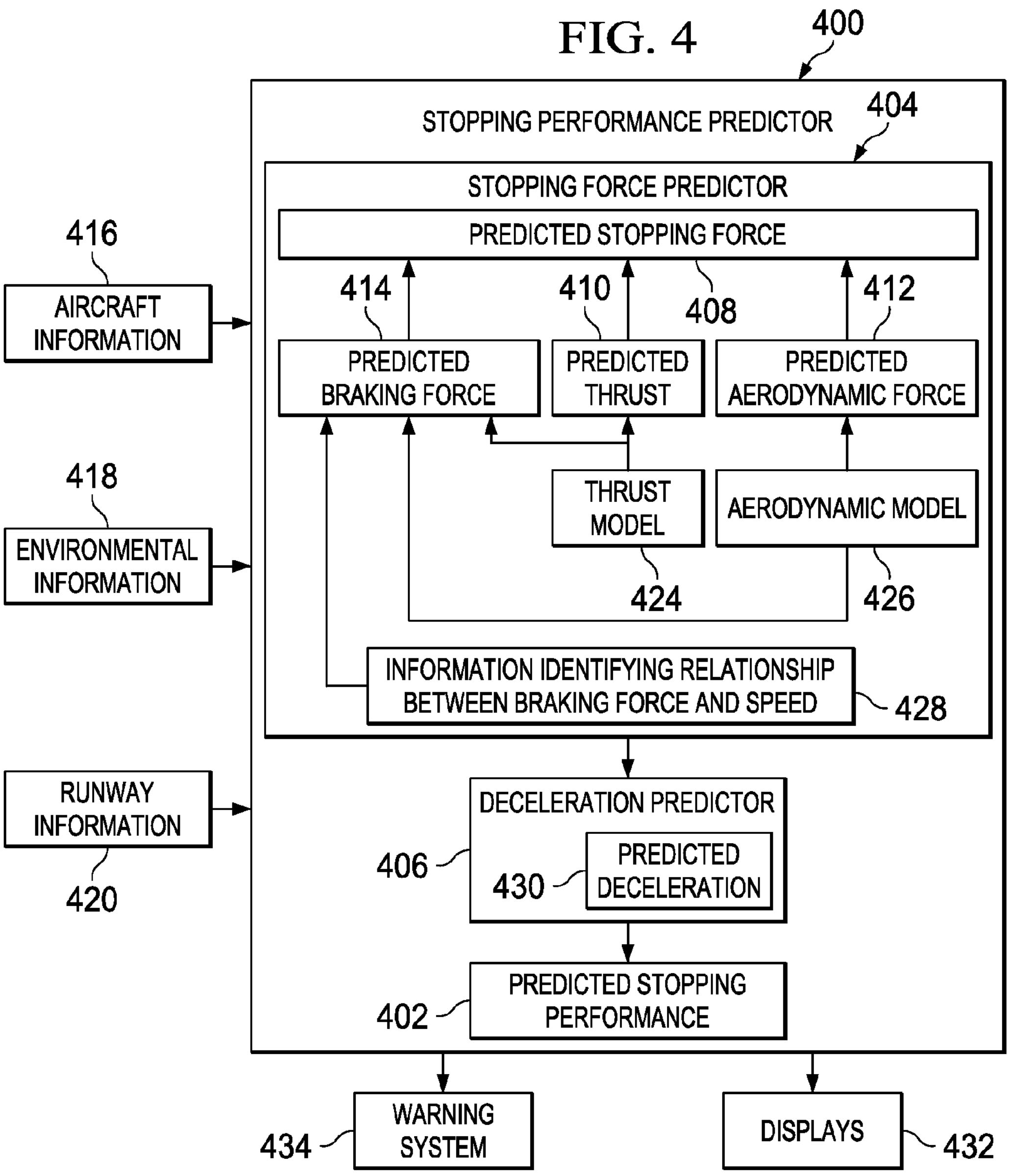
FIG. 4 is an illustration of a block diagram of a stopping performance predictor in accordance with an illustrative embodiment.

Turning to FIG. 4, an illustration of a block diagram of a stopping performance predictor is depicted in accordance with an illustrative embodiment. In this example, stopping performance predictor 400 may be an example of one implementation of stopping performance predictor 282 in FIG. 2 and stopping performance predictor 300 in FIG. 3.

Stopping performance predictor 400 may be configured to determine predicted stopping performance 402 for an aircraft. Predicted stopping performance 402 may identify the ability of the aircraft moving on a runway to be brought to a stop based on the control of various systems on the aircraft to stop the aircraft and the condition of the runway. In accordance with an illustrative embodiment, stopping performance predictor 400 may include stopping force predictor 404 and deceleration predictor 406.

Stopping force predictor 404 may be configured to determine predicted stopping force 408. Predicted stopping force 408 may comprise a prediction of the force acting on an aircraft moving on a runway to stop the aircraft. For example, without limitation, predicted stopping force 408 may include a prediction of the force acting on the aircraft to stop the aircraft for a number of speeds from the current speed of the aircraft on the runway to zero.

Predicted stopping force 408 may be determined by determining and combining predicted thrust 410, predicted aerodynamic force 412, and predicted braking force 414. Predicted thrust 410 may comprise a prediction of the force provided by a number of the engines on the aircraft to stop the aircraft moving on the runway. Predicted aerodynamic force 412 may comprise a prediction of the aerodynamic force acting on the aircraft to stop the aircraft as the aircraft is moving on the runway. Predicted braking force 414 may comprise a prediction of the force provided by a braking system on the aircraft to stop the aircraft moving on the runway.

Stopping force predictor 404 may be configured to use various types of information from various sources to determine accurately one or more of predicted thrust 410, predicted aerodynamic force 412, and predicted braking force 414. For example, without limitation, stopping force predictor 404 may be configures to use one or more of aircraft information 416, environmental information 418, runway information 420, and other information, as described above, to determine one or more of predicted thrust 410, predicted aerodynamic force 412, and predicted braking force 414.

Stopping force predictor 404 may be configured to use thrust model 424 to determine predicted thrust 410. For example, without limitation, thrust model 424 may comprise any appropriate computer implemented or other model of the thrust provided by the engines of an aircraft moving on a runway for various thrust settings.

Stopping force predictor 404 may be configured to use aerodynamic model 426 to determine predicted aerodynamic force 412. For example, without limitation, aerodynamic model 426 may comprise any appropriate computer implemented or other model of the aerodynamic characteristics of an aircraft moving on a runway for various settings of the aerodynamic systems on the aircraft.

Stopping force predictor 404 also may be configured to use thrust model 424 and aerodynamic model 426 to determine predicted braking force 414. Information identifying a relationship between braking force and speed 428 also may be used by stopping force predictor 404 to determine predicted braking force 414. For example, without limitation, information identifying a relationship between braking force and speed 428 may identify a maximum braking force that may be provided by the braking system on an aircraft for a range of speeds of the aircraft moving on a runway. Information identifying a relationship between braking force and speed 428 may be provided for one or more assumed runway conditions. For example, without limitation, information identifying a relationship between braking force and speed 428 may be based on an empirical analysis of the braking capabilities of the aircraft or of a similar type of aircraft.

Deceleration predictor 406 may be configured to use predicted stopping force 408, as determined by stopping force predictor 404, to determine predicted deceleration 430. Predicted deceleration 430 may comprise a prediction of the rate of reduction of the speed of an aircraft moving on a runway as the aircraft is slowed and brought to a stop. For example, without limitation, predicted deceleration 430 may include a prediction of the deceleration of the aircraft for a number of speeds from the current speed of the aircraft on the runway to zero.

Stopping performance predictor 400 may be configured to use predicted deceleration 430, as determined by deceleration predictor 406, to determine predicted stopping performance 402. An indication of predicted stopping performance 402 may be provided to an operator of an aircraft on a number of displays 432. An overrun warning may be provided via an appropriate warning system 434 in response to predicted stopping performance 402 indicating that the aircraft is likely to overrun the runway on which it is moving.

The illustrations of FIG. 3 and FIG. 4 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 5:
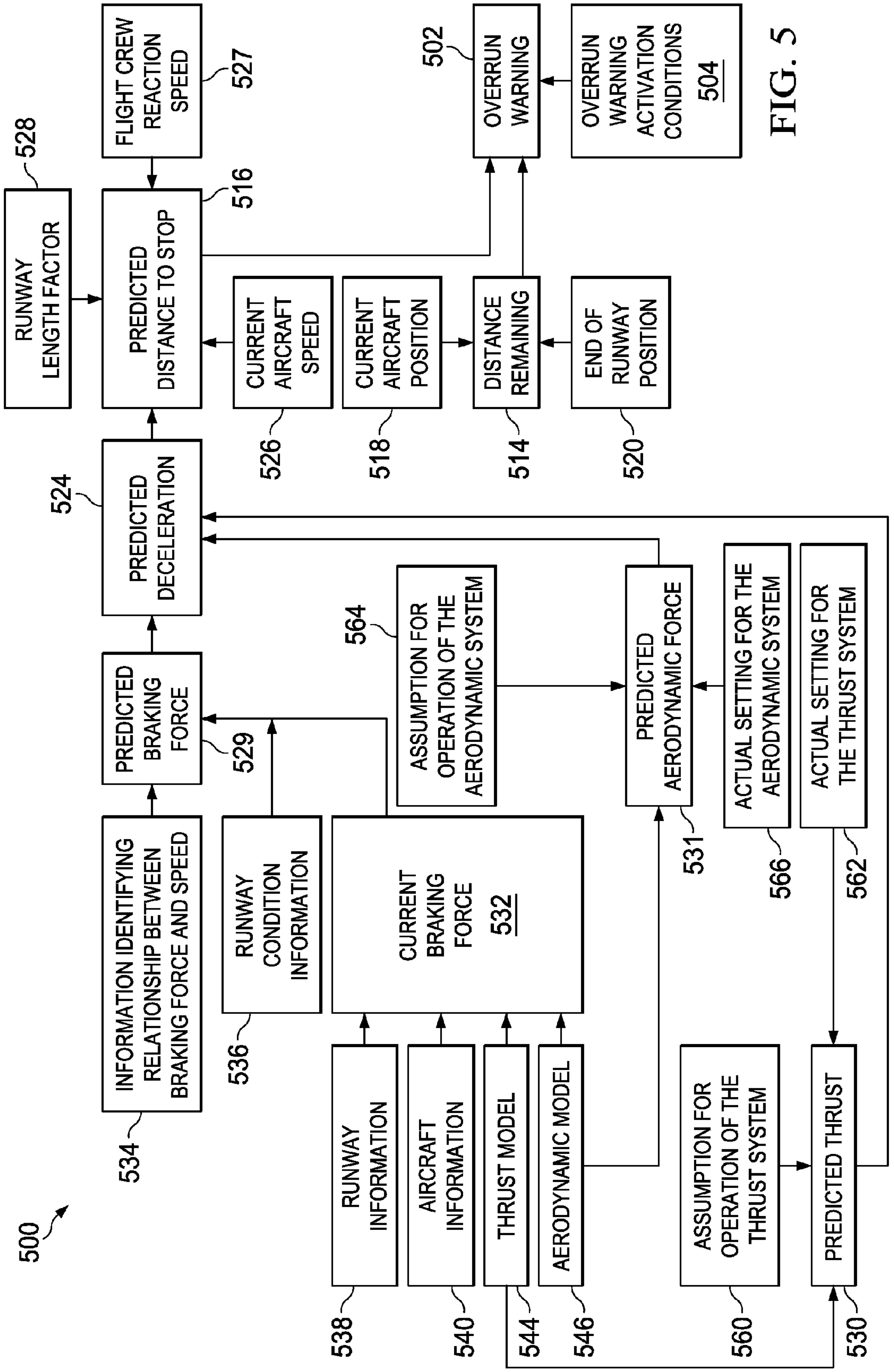
FIG. 5 is an illustration of a block diagram of a stopping performance predictor and overrun warning generator in accordance with an illustrative embodiment.

Turning to FIG. 5, an illustration of a block diagram of a stopping performance predictor and overrun warning generator is depicted in accordance with an illustrative embodiment. In this example, stopping performance predictor and overrun warning generator 500 may be an example of one implementation of stopping performance predictor 300 and overrun warning generator 302 in FIG. 3. FIG. 5 illustrates relationships between the information that may be used and the calculations that may be performed by stopping performance predictor and overrun warning generator 500 to provide overrun warning 502.

Overrun warning 502 may be provided to indicate that an aircraft is likely to overrun the runway on which it is moving unless appropriate action is taken. In accordance with an illustrative embodiment, overrun warning 502 may be provided only if a number of overrun warning activation conditions 504 are satisfied. Overrun warning activation conditions 504 may be selected to prevent overrun warning 502 from being provided in situations where a determination that the aircraft is likely to overrun the runway is likely to be incorrect. Overrun warning activation conditions 504 thus may be used to prevent overrun warning 502 from being provided in situations where overrun warning 502 may be more of a nuisance than a help to the operator of an aircraft.

Overrun warning 502 may be generated in response to a determination that distance remaining 514 is less than predicted distance to stop 516. Distance remaining 514 may refer to the distance between current aircraft position 518 and end of runway position 520. Current aircraft position 518 may be the current position of an aircraft moving on a runway. End of runway position 520 may be the position of a boundary beyond which it is not desirable to bring the aircraft to a stop. In other words, end of runway position 520 may refer to an undesirable position for stopping the aircraft. Distance remaining 514 may refer to the distance between current aircraft position 518 and end of runway position 520 in the direction of movement of the aircraft on the runway from current aircraft position 518 to end of runway position 520.

Predicted distance to stop 516 may be determined from current aircraft speed 526 and predicted deceleration 524 of the aircraft. Predicted distance to stop 516 may be determined from current aircraft speed 526 and predicted deceleration 524 in any appropriate manner. Predicted distance to stop 516 also may take into account other appropriate factors such that overrun warning 502 is timely and accurate in various situations. For example, without limitation, predicted distance to stop 516 may take into account flight crew reaction speed 527, runway length factor 528, other appropriate factors, or various combinations of such factors.

Flight crew reaction speed 527 may refer to the amount of time that it may take for the flight crew or other operator of an aircraft to take appropriate action in response to overrun warning 502. Predicted distance to stop 516 may be increased to take into account flight crew reaction speed 527. Increasing predicted distance to stop 516 in response to flight crew reaction speed 527 may result in providing overrun warning 502 earlier, thereby providing an appropriate amount of time for the flight crew or other operator of the aircraft to respond to overrun warning 502 and take appropriate action to avoid overrunning the runway.

Predicted distance to stop 516 for an aircraft may be determined based on an assumption that the aircraft is landing on a runway having a runway length that is typical or common for a runway on which the aircraft will land. However, if the aircraft is landing on a runway that is substantially shorter or substantially longer than the length of runway on which the aircraft typically lands, predicted distance to stop 516 may not be determined accurately. Runway length factor 528 may be used to adjust predicted distance to stop 516 in an appropriate manner in such cases when the aircraft is landing on a runway that is substantially different in length from the length of runway on which the aircraft typically lands.

For example, without limitation, the length of a runway on which an aircraft is landing may be identified by an operator of the aircraft prior to landing, from information about the runway stored in an appropriate database, or in any other appropriate manner. The length of a runway may refer to the available landing distance of the runway. The length of the runway on which the aircraft is landing may be compared to one or more threshold length values to determine whether the length of the runway on which the aircraft is landing is substantially different from the length of runway assumed for determining predicted distance to stop 516. Runway length factor 528 may be calculated and used to modify predicted distance to stop 516 in response to a determination that the length of the runway on which the aircraft is landing is substantially different from the length of runway assumed for determining predicted distance to stop 516. For example, without limitation, runway length factor 528 may be determined as a function of aircraft gross weight, pressure altitude, and runway length, or in any other appropriate manner.

For example, without limitation, runway length factor 528 may be used to adjust predicted distance to stop 516 in an appropriate manner when a commercial passenger or other aircraft is landing on a runway with an available stopping distance less than approximately 6000 feet or another appropriate distance. A commercial passenger aircraft or other aircraft may only attempt to land on a runway that is substantially shorter than the length of runway on which the aircraft typically lands when landing weight and atmospheric conditions permit a stop that is quicker than a conservative alerting tolerance may assume to be possible. If this is not taken into account, it may be more likely that overrun warning 502 is provided in cases where the aircraft is not likely to overrun the runway. Runway length factor 528 may be used to allow aircraft to operate under normal operating parameters into airports to which they could be dispatched and allows for some variation from an ideal touchdown speed and point to prevent nuisance alerts.

Predicted deceleration 524 of an aircraft moving on a runway may be determined by determining the predicted forces acting on the aircraft to stop the aircraft moving on the runway. For example, the predicted stopping forces acting on an aircraft to stop an aircraft moving on a runway may include predicted braking force 529, predicted thrust 530, predicted aerodynamic force 531, other appropriate stopping forces, or various combinations of stopping forces. For example, without limitation, the weight of an aircraft is another force that may affect predicted deceleration 524 of an aircraft moving on an inclined runway. This force may be estimated using the aircraft pitch or a database of appropriate runway information.

Predicted braking force 529 may be a prediction of the stopping force provided by the braking system of an aircraft moving on a runway. Predicted braking force 529 may take into account the predicted friction between the wheels of an aircraft and the surface of the runway on which the aircraft is moving. For example, without limitation, predicted braking force 529 may comprise a prediction of the stopping force provided by the braking system of an aircraft moving on a runway for each of a plurality of speeds of the aircraft moving on the runway between current aircraft speed 526 and zero speed. For example, without limitation, predicted braking force 529 may be determined using current braking force 532, information identifying a relationship between braking force and speed 534, runway condition information 536, other appropriate information, or any appropriate combination of such information. For example, current friction between the wheels of an aircraft and the runway on which the aircraft is moving may be determined and used as an alternative to, or in addition to, current braking force 532 for determining predicted braking force 529.

Current braking force 532 may refer to the current force provided by the braking system of an aircraft moving on a runway to stop the aircraft when the aircraft is moving on the runway at current aircraft speed 526. Current braking force 532 may be determined using runway information 538, aircraft information 540, aircraft thrust as determined from thrust model 544, aircraft lift and drag as determined from aerodynamic model 546, other appropriate information, or any appropriate combination of such information. Runway information 538 may include any appropriate information identifying various characteristics of the runway on which the aircraft is moving. Aircraft information 540 may include any appropriate information identifying the current state or condition of the aircraft, the state or condition of various systems on the aircraft, or both. Thrust model 544 may comprise any appropriate computer implemented or other model of the thrust provided by the engines of an aircraft moving on a runway. Aerodynamic model 546 may comprise any appropriate computer implemented or other model of the aerodynamic characteristics of an aircraft moving on a runway.

For example, without limitation, information identifying a relationship between braking force and speed 534 may identify a maximum braking force that may be provided by the braking system on an aircraft for a range of speeds of the aircraft moving on a runway. Predicted braking force 529 for each of a plurality of speeds of an aircraft moving on a runway between current aircraft speed 526 and zero speed may be determined by extrapolation from current braking force 532 using information identifying a relationship between braking force and speed 534.

Information identifying a relationship between braking force and speed 534 may be provided for one or more assumed runway conditions. The assumed runway conditions for information identifying a relationship between braking force and speed 534 that is used to determine predicted braking force 529 may be selected to reduce the likelihood of providing overrun warning 502 inappropriately when it is not likely that an aircraft will overrun a runway. For example, without limitation, use of information identifying a relationship between braking force and speed 534 that assumes a wet runway condition may provide a desired balance between providing overrun warning 502 when an aircraft is likely to overrun a runway and reducing nuisance alerts when the aircraft is not likely to overrun the runway.

Runway condition information 536 may include any appropriate information identifying the condition of a runway on which an aircraft is moving. Runway condition information 536 may be used to determine how current braking force 532 and information identifying a relationship between braking force and speed 534 are used to determine predicted braking force 529 in a more accurate manner. For example, without limitation, runway condition information 536 may include real time information for identifying the condition of a runway and may be used to reduce the likelihood that overrun warning 502 is provided in situations where it is not likely that an aircraft will overrun the runway on which it is moving.

Predicted thrust 530 may be a prediction of the stopping force provided by the thrust system of an aircraft moving on a runway as the aircraft is brought to a stop. Predicted thrust 530 may be determined using thrust model 544. Predicted thrust 530 may be determined using assumption for operation of the thrust system 560, actual setting for the thrust system 562, or both, to determine predicted thrust 530 more accurately. For example, without limitation, assumption for operation of the thrust system 560 may include the assumption that the thrust system on an aircraft will be used to slow down the aircraft moving on a runway even if the thrust system is not engaged immediately after landing on the runway. Assumption for operation of the thrust system 560 may be used to determine predicted thrust 530 for a few seconds after landing. Actual setting for the thrust system 562 may indicate the actual inputs provided by an operator of an aircraft to control the thrust system on the aircraft to stop the aircraft moving on a runway. Actual setting for the thrust system 562 may be used to determine predicted thrust 530 after a few seconds after landing. Using assumption for operation of the thrust system 560 and actual setting for the thrust system 562 to determine predicted thrust 530 in this manner may reflect normal operating procedures and prevent nuisance alerts while still accounting for risk factors that may make an overrun more likely, such as delayed reverse thrust usage.

Predicted aerodynamic force 531 may be a prediction of the stopping force provided by the aerodynamic system of an aircraft moving on a runway. Predicted aerodynamic force 531 may be determined using aerodynamic model 546. Predicted aerodynamic force 531 may be determined using assumption for operation of the aerodynamic system 564, actual setting for the aerodynamic system 566, or both, to determine predicted aerodynamic force 531 more accurately.

For example, without limitation, assumption for operation of the aerodynamic system 564 may include the assumption that a speed brake on an aircraft will be used to slow down the aircraft moving on a runway even if the speed brake is not deployed immediately after landing on the runway. Alternatively, or in addition, assumption for operation of the aerodynamic system 564 may include assumptions for the operation of a number of other components of an aircraft aerodynamic system to stop the aircraft moving on a runway. Assumption for operation of the aerodynamic system 564 may be used to determine predicted aerodynamic force 531 for a few seconds after landing. Actual setting for the aerodynamic system 566 may indicate the actual inputs provided by an operator of an aircraft to control the speed brake, other components of the aircraft aerodynamic system, or various combinations of components of the aerodynamic system on an aircraft to stop the aircraft moving on a runway. Actual setting for the aerodynamic system 566 may be used to determine predicted aerodynamic force 531 after a few seconds after landing. Using assumption for operation of the aerodynamic system 564 and actual setting for the aerodynamic system 566 to determine predicted aerodynamic force 531 in this manner may reflect normal operating procedures and prevent nuisance alerts while still accounting for risk factors that may make an overrun more likely, such as delayed deployment of the speed brake.

Figure 6:
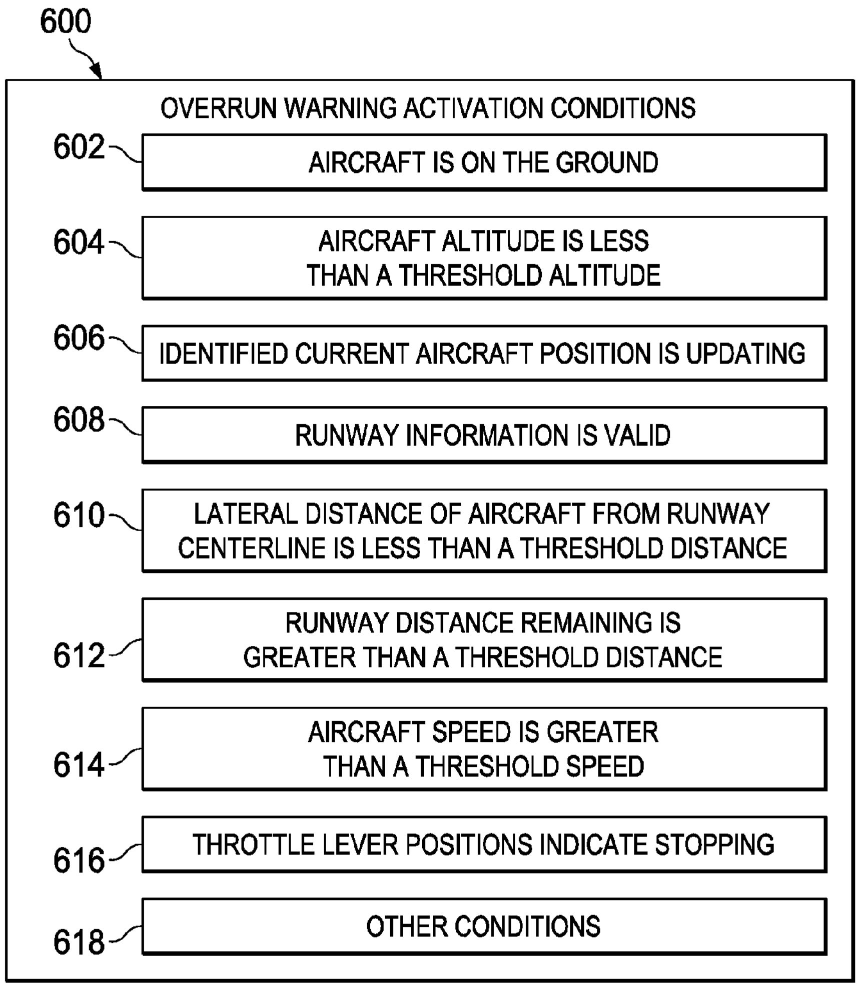
FIG. 6 is an illustration of a block diagram of overrun warning activation conditions in accordance with an illustrative embodiment.

Turning to FIG. 6, an illustration of a block diagram of overrun warning activation conditions is depicted in accordance with an illustrative embodiment. In this example, overrun warning activation conditions 600 may be an example of one implementation of overrun warning activation conditions 504 in FIG. 5. A particular illustrative embodiment may use some, all, or none of overrun warning activation conditions 600 described as examples herein.

Overrun warning activation conditions 600 may be selected to prevent an overrun warning from being provided at unintended times when the overrun warning is likely to be incorrect. For example, without limitation, an overrun warning may be provided only when all of overrun warning activation conditions 600 are determined to be true. Alternatively, or in addition, a number of overrun warning activation conditions 600 may be defined such that the providing of an overrun warning is prevented when at least one of the number of overrun warning activation conditions 600 is determined not to be true.

An overrun warning may be provided for an aircraft only when it is determined that the aircraft is on the ground 602. For example, without limitation, appropriate sensors in the landing gear of an aircraft may be used to determine whether aircraft is on the ground 602. An aircraft landing on a runway may bounce on the landing gear a number of times before the aircraft settles down on the runway. Such bouncing may cause the sensors in the landing gear to toggle between indicating that the aircraft is on the ground and that the aircraft is not on the ground. An appropriate time delay may be used such that the determination that aircraft is on the ground 602 is made only when the sensors in the landing gear indicate that the aircraft is on the ground continuously for at least the time delay. The duration of the time delay may be selected as appropriate to prevent the determination that aircraft is on the ground 602 from the sensors in the landing gear of the aircraft until any bouncing in the landing gear has stopped and the aircraft is settled down on the runway. For example, without limitation, the time delay may be selected to be approximately 0.5 seconds or any other appropriate duration.

An overrun warning may be provided for an aircraft only when it is determined that the aircraft altitude is less than a threshold altitude 604. For example, without limitation, the threshold altitude used to determine whether aircraft altitude is less than a threshold altitude 604 may be selected such that aircraft altitude is less than a threshold altitude 604 when aircraft is on the ground 602. The altitude of the aircraft that is used to determine whether aircraft altitude is less than a threshold altitude 604 may be determined in any appropriate manner. For example, without limitation, whether aircraft altitude is less than a threshold altitude 604 may be determined using an altitude for the aircraft that is determined using a radio altimeter or another appropriate device or method for determining the altitude of an aircraft.

An overrun warning may be provided for an aircraft only when it is determined that identified current aircraft position is updating 606. The current position of an aircraft moving on a runway may need to be identified to determine whether an overrun warning should be provided for the aircraft. The identified current position of an aircraft moving on a runway should be changing as the aircraft is moving on the runway. If the identified position of the aircraft does not change as the aircraft is moving on the runway there may be something wrong with the system used to identify the current position of the aircraft and the identified current position of the aircraft is not likely to be accurate. In this case, the determination of whether an overrun warning should be provided for the aircraft also is likely to be inaccurate. Therefore, an overrun warning may not be provided unless identified current aircraft position is updating 606 as the aircraft moves on a runway.

An overrun warning may be provided for an aircraft only when it is determined that runway information is valid 608 and lateral distance of aircraft from runway centerline is less than a threshold distance 610. Runway information, such as information identifying the position of the end of a runway, may be used to determine whether an overrun warning should be provided for an aircraft moving on the runway. If the information for the runway on which the aircraft is moving is not accurate, the determination of whether to provide an overrun warning is likely to be inaccurate. For example, a pilot or other operator of an aircraft may identify the runway on which an aircraft is landing using a flight management computer on the aircraft or in any other appropriate manner. If the runway identified by the aircraft operator is not a valid runway for landing the aircraft or valid information for the identified runway is not available for determining whether an overrun warning should be provided, then the determination of whether to provide an overrun warning is likely to be inaccurate. Therefore, an overrun warning may not be provided unless it is determined that runway information is valid 608.

The operator of an aircraft may identify a valid runway for landing an aircraft and valid runway information for the identified runway may be available for determining whether to provide an overrun warning. However, the aircraft may land on a runway that is different from the runway identified by the aircraft operator. In this case, the wrong runway information may be used to determine whether an overrun warning should be provided and the determination of whether to provide the overrun warning is likely to be inaccurate.

If lateral distance of aircraft from runway center line is less than a threshold distance 610, then it is likely that the aircraft is on the runway identified by the aircraft operator and that the correct runway information is being used to determine whether an overrun warning should be provided. Any appropriate threshold distance for determining whether or not an aircraft is on a runway identified by the aircraft operator may be used for determining whether lateral distance of aircraft from runway centerline is less than a threshold distance 610. For example, without limitation, a threshold distance of approximately 300 feet, or any other appropriate threshold distance, may be used to determine whether lateral distance of aircraft from runway centerline is less than a threshold distance 610. Alternatively, or additionally, other appropriate conditions may be included in overrun warning activation conditions 600 to prevent the providing of an overrun warning for an aircraft when the aircraft is moving on a runway that is different from the runway identified by the aircraft operator.

An overrun warning may be provided for an aircraft only when it is determined that runway distance remaining is greater than a threshold distance 612 and aircraft speed is greater than a threshold speed 614. An overrun warning that is provided as an aircraft is about to overrun a runway, when preventing the overrun may not be possible, may be more of a nuisance than helpful. Therefore, an overrun warning may not be provided unless runway distance remaining is greater than a threshold distance 612. An overrun warning that is provided when an aircraft is stopped or almost at a stop may be unnecessary and is most likely to be considered a nuisance. Therefore, an overrun warning may not be provided unless aircraft speed is greater than a threshold speed 614. Any threshold distance that may be appropriate for reducing nuisance overrun warnings may be used for determining whether runway distance is greater than a threshold distance 612. Any threshold speed that may be appropriate for reducing nuisance overrun warnings may be used for determining whether aircraft speed is greater than a threshold speed 614.

An overrun warning may be provided for an aircraft only when it is determined that throttle lever positions indicate stopping 616. An overrun warning that is provided for an aircraft when the aircraft is not attempting to slow down or stop on a runway may be a nuisance. A throttle lever on an aircraft may be operated by the pilot or other operator of an aircraft to control the thrust system on the aircraft. The position of operation of a throttle lever on an aircraft may indicate that the aircraft is attempting to take off from a runway or is moving on the runway for some purpose other than following a landing. An overrun warning that is provided in such a situation may be a nuisance. Therefore, an overrun warning may not be provided unless throttle lever positions indicate stopping 616.

Throttle lever positions indicate stopping 616 may include any appropriate positions of operation for a throttle lever on an aircraft that may be consistent with the operation of an aircraft moving on a runway to slow down and stop the aircraft. Alternatively, or additionally, other appropriate conditions may be included in overrun warning activation conditions 600 to prevent the providing of an overrun warning for an aircraft when the thrust system of the aircraft is being controlled in a manner that indicates an intention other than to slow down and stop the aircraft moving on a runway.

An overrun warning may be provided for an aircraft only when it is determined that other conditions 618 are satisfied or true. Other conditions 618 may include any appropriate conditions for preventing an overrun warning from being provided at unintended times, such as when the overrun warning is likely to be a nuisance rather than helpful.

Figure 7:
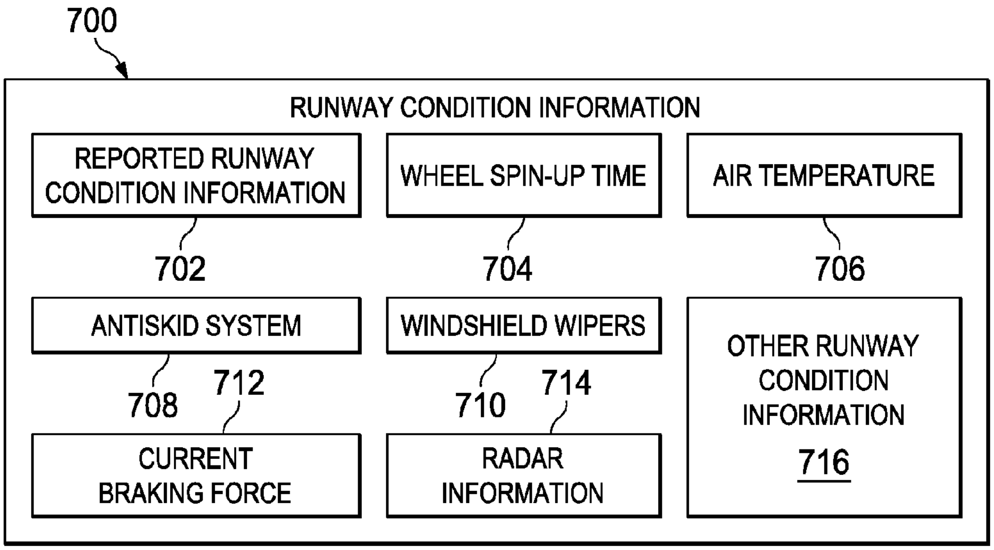
FIG. 7 is an illustration of a block diagram of runway condition information in accordance with an illustrative embodiment.

Turning to FIG. 7, an illustration of a block diagram of runway condition information is depicted in accordance with an illustrative embodiment. In this example, runway condition information 700 may be an example of one implementation of runway condition information 536 in FIG. 5. A particular illustrative embodiment may use some, all, or none of runway condition information 700 described as examples herein.

Runway condition information 700 may include any appropriate information identifying the condition of a runway on which an aircraft is moving. Runway condition information 700 may identify the condition of a runway directly or indirectly. For example, without limitation, runway condition information 700 may include information from which the condition of a runway may be inferred. Various combinations of runway condition information 700 may be used to identify the condition of a runway. For example, a portion of runway condition information 700 may be used to confirm or contradict a determination of the condition of a runway that may be made based on another portion of runway condition information 700.

Runway condition information 700 may include reported runway condition information 702. Reported runway condition information 702 may include any appropriate information identifying the condition of a runway on which an aircraft is moving. Reported runway condition information 702 may be provided from any appropriate source and in any appropriate manner. For example, without limitation, reported runway condition information 702 may be provided via operator input, a digital uplink from an airport, or in any other appropriate manner.

Runway condition information 700 may include wheel spin-up time 704. Wheel spin-up time 704 may refer to the amount of time that it takes for the wheels of an aircraft to spin up to synchronous speed after the aircraft lands on a runway. Wheel spin-up time 704 may be determined using information provided by appropriate sensors for detecting the speed of rotation of the aircraft wheels. Wheel spin-up time 704 may be used to identify the condition of the runway on which the wheels are rolling. For example, without limitation, wheel spin-up time 704 that is relatively short may indicate that the surface of the runway is dry.

Runway condition information 700 may include air temperature 706. Air temperature 706 may refer to the temperature of the outside air in the area of a runway. Air temperature 706 may be determined in any appropriate manner. For example, air temperature 706 may be determined using an appropriate temperature sensor that may be located on an aircraft, on or near the runway, or in any other appropriate location. Air temperature 706 may be used in combination with other information to determine the condition of a runway. For example, air temperature 706 above freezing in combination with information indicating precipitation in the area of a runway may indicate that the runway is wet. Air temperature 706 below freezing in combination with information indicating precipitation in the area of a runway may indicate that the runway is icy.

Runway condition information 700 may include information provided by antiskid system 708 on an aircraft. Antiskid system 708 may be configured to prevent the undesirable skidding of an aircraft braking on a runway when runway conditions provide relatively very low friction. Therefore, the condition of a runway may be identified as slippery when antiskid system 708 is controlling the braking of an aircraft moving on a runway to prevent skidding.

Runway condition information 700 may include information identifying the operation of windshield wipers 710 on an aircraft. For example, precipitation may be identified in the area of a runway in response to a determination that windshield wipers 710 on an aircraft on the runway are turned on. This information may be used either alone or in combination with other information, such as air temperature 706, to identify the condition of the runway.

Runway condition information 700 may include information identifying current braking force 712 provided by the braking system of an aircraft moving on a runway to stop the aircraft. For example, the condition of a runway may be identified from current braking force 712 or a change in current braking force 712 provided by the braking system of an aircraft moving on the runway over time either alone or in combination with other information.

Runway condition information 700 may include radar information 714. For example, without limitation, radar information 714 may identify precipitation, other environmental conditions, or various combinations of environmental or other conditions in the area of a runway. Radar information 714 may be used either alone or in combination with other information to identify the condition of a runway. Radar information 714 may be provided by a number of appropriate radars located on an aircraft moving on the runway or in any other appropriate location.

Runway condition information 700 may include other runway condition information 716. Other runway condition information 716 may include any appropriate information identifying the condition of a runway on which an aircraft is moving. Other runway condition information 716 may be provided from any appropriate source. For example, without limitation, other runway condition information 716 may include environmental or other information that is provided by systems on an aircraft, systems that are not on an aircraft, or both.

Figure 8:
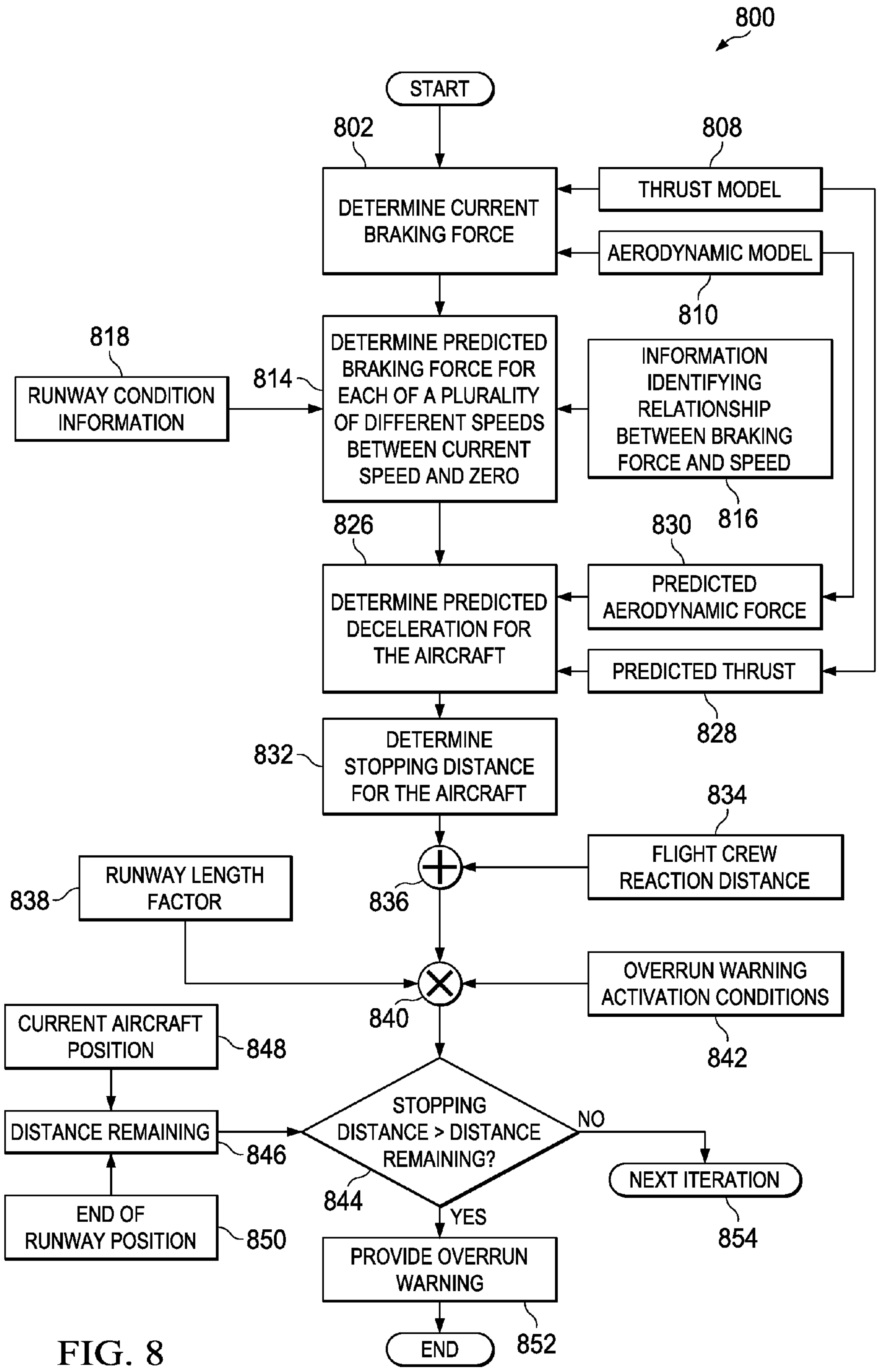
FIG. 8 is an illustration of a flowchart of a process for generating an overrun warning in accordance with an illustrative embodiment.

Turning to FIG. 8, an illustration of a flowchart of a process for generating an overrun warning is depicted in accordance with an illustrative embodiment. In this example, process 800 may be an example of one implementation of a process performed by overrun warning generator 302 to provide overrun warning 306 in FIG. 3 or of a process performed by stopping performance predictor and overrun warning generator 500 to provide overrun warning 502 in FIG. 5.

Process 800 may begin by determining a current braking force (operation 802). The current braking force may be an estimate of the current force provided by the braking system of an aircraft to stop the aircraft moving on a runway. The current braking force may be determined in any appropriate manner. For example, without limitation, the current braking force $\mu_B$ may be determined using the following equation:

$$\mu_B = \frac{T\cos(\theta-\eta) - D - W[n_X\cos(\theta-\eta) - n_Z\sin(\theta-\eta)]}{W\cos\eta - L}$$

where T is the current thrust provided by the thrust system of the aircraft, θ is the pitch attitude of the aircraft, η is the slope of the runway, D is the drag of the aircraft, W is the weight of the aircraft, $n_X$ is a longitudinal load factor, $n_Z$ is a vertical load factor, and L is the lift of the aircraft. The current thrust T may be determined using an appropriate thrust model 808 of the aircraft. Drag D and lift L may be determined using an appropriate aerodynamic model 810 of the aircraft. Longitudinal load factor $n_X$ is the net force in the longitudinal direction, minus the component of weight in the longitudinal direction, divided by the weight of the aircraft. Vertical load factor $n_Z$ is the net force in the vertical direction, minus the component of weight in the vertical direction, divided by the weight of the aircraft.

The current braking force determined at operation 802 then may be used to determine a predicted braking force for each of a plurality of different speeds of the aircraft moving on the runway between the current speed of the aircraft and zero speed (operation 814). For example, without limitation, the predicted braking force for each of the plurality of speeds of the aircraft moving on the runway may be determined from the current braking force using information identifying relationship between braking force and speed 816 for the aircraft. For example, without limitation, information identifying relationship between braking force and speed 816 may identify a maximum braking force that may be provided by the braking system on the aircraft for a range of speeds of the aircraft moving on a runway.

Runway condition information 818 also may be used to determine the predicted braking force for each of the plurality of speeds of the aircraft in a more accurate manner. Runway condition information 818 may include any appropriate information identifying the condition of the runway on which the aircraft is moving.

For example, without limitation, runway condition information 818 may include an initial estimation of the condition of the runway by the flight crew of the aircraft. Such runway condition information 818 may be based on airport weather reporting and may be input by the flight crew through a multi-function display or in another appropriate manner.

Runway condition information 818 also may be provided by the spin-up time of the aircraft wheels. For example, without limitation, upon touchdown of an aircraft on a runway, the wheel spin-up time may be monitored to determine the time required after the aircraft touches down for the wheels to spin up to synchronous speed. If the wheel spin-up time is below a selected threshold, the runway may be classified as being dry. Otherwise, the runway may be classified as not being dry and an initial wet runway condition may be assumed.

After an initial classification of the runway condition is made, runway condition information 818 provided by the antiskid system on the aircraft and overall braking performance may be monitored to detect changes from the initial assumed runway condition. For example, without limitation, when the runway on which an aircraft is moving is very slippery, the stopping force provided by the aircraft braking system may be friction-limited. In this case, the current braking force may provide a lower bound on the friction generating capability of the runway, which is described by the maximum aircraft braking force. If the current aircraft braking force determined at any time is greater than the previous value, the current aircraft braking force may be updated to the new value.

When the applied brake pressure is sufficiently high, a factor for braking capability remaining may be computed by the aircraft antiskid system. This factor allows the maximum aircraft braking force to be estimated, which provides a further indication of the runway condition prior to the aircraft being friction-limited. The aircraft is friction-limited when an increased brake pressure application does not cause an increased braking force. The parameter for braking capability remaining may be computed as a function of actual wheel slip and an optimum wheel slip.

Only a small percentage of landings are friction limited. Having runway condition information 818 for runway condition in non-friction-limited conditions may provide a robust runway condition reporting system via the same provisions of the overrun alerting algorithm. When the aircraft is friction-limited, the current aircraft braking force represents the complete friction-generating capability of the runway and the assumed runway condition may be estimated according to the current aircraft braking force value computed.

Having an estimate of the current maximum aircraft braking force, an estimate may be made of how the maximum aircraft braking force will vary during the remainder of the rollout for the purpose of computing an estimated stopping distance. Outside air temperature is another example of runway condition information 818 that may be used to determine the predicted braking force during the remainder of the aircraft rollout. For example, without limitation, it may be assumed that when the outside air temperature is sufficiently high, it is unlikely that the runway will be icy and, therefore, the maximum aircraft braking force may be predicted to increase with decreasing speed if the runway is wet, due to the physics of the tire to ground contact patch on a wet runway. However, when the outside air temperature is sufficiently low, it may be assumed that the maximum aircraft braking coefficient will remain constant throughout the landing rollout to account for potentially contaminated runways. Filters may be used to determine whether the maximum aircraft braking force is increasing or remaining constant contrary to the assumed estimation of the runway condition based on air temperature.

Other runway condition information 818 that may be used to determine the predicted braking force for the aircraft may include, without limitation, the operation of windshield wipers and the presence of radar returns over the airport, both of which may indicate a high likelihood of non-dry runway conditions.

After determining the predicted braking force for the aircraft at operation 814, predicted deceleration for the aircraft may be determined (operation 826). For example, the predicted deceleration determined at operation 826 may include a predicted deceleration for each of a plurality of speeds of the aircraft moving on a runway between the current speed of the aircraft and zero speed. The predicted deceleration of the aircraft may be determined using the predicted braking force for the aircraft determined at operation 814 along with predicted thrust 828 and predicted aerodynamic force 830. Predicted thrust 828 may comprise a prediction of the thrust provided by a thrust system on the aircraft to stop the aircraft moving on the runway. Predicted aerodynamic force 830 may comprise a prediction of the aerodynamic force provided by the aircraft moving on the runway to stop the aircraft. The combination of the predicted braking force, predicted thrust 828, and predicted aerodynamic force 830 may comprise a prediction of the stopping force acting to stop the aircraft moving on the runway.

Predicted thrust 828 may be determined using thrust model 808. Predicted thrust 828 may be determined using appropriate assumptions for operation of the thrust system on an aircraft during a landing to reduce the occurrence of inaccurate nuisance alerts. Predicted aerodynamic force 830 may be determined using aerodynamic model 810. Predicted aerodynamic force 830 may be determined using appropriate assumptions for operation of aerodynamic systems on an aircraft during a landing to reduce the occurrence of inaccurate nuisance alerts.

Stopping distance for the aircraft then may be determined (operation 832). A predicted stopping distance for the aircraft may be determined using the predicted deceleration for the aircraft determined in operation 826 and the current speed of the aircraft on a runway. For example, without limitation, the stopping distance d may be determined using the following equation:

$$d = \int_{V_0}^{0} \frac{V}{a(V)} dV$$

where $V_0$ is the current speed of the aircraft, V is aircraft ground speed, and a(V) are predicted decelerations of the aircraft as a function of aircraft speed determined at operation 826.

Flight crew reaction distance 834 may be added to the determined stopping distance (operation 836). Flight crew reaction distance 834 may be an estimate of the distance that an aircraft moves on a runway before the flight crew is able to respond to a warning.

The stopping distance also may be modified by runway length factor 838 if appropriate (operation 840). Runway length factor 838 may be calculated and used to modify the predicted stopping distance in response to a determination that the length of the runway on which the aircraft is landing is substantially different from the length of runway assumed for determining the predicted stopping distance.

Overrun warning activation conditions 842 may be used at operation 840 to activate or suppress the providing of an overrun warning. Overrun warning activation conditions 842 may be used to prevent the providing of an overrun warning under conditions wherein the warning is not likely to be accurate. Overrun warning activation conditions 842 may be taken into account at other points in process 800 to enable or suppress the providing of an overrun warning when appropriate.

It then may be determined whether the predicted stopping distance is greater than a distance remaining (operation 844). Distance remaining 846 used in making the determination in operation 844 may be determined from the difference between current aircraft position 848 and end of runway position 850. Current aircraft position 848 may be the current position of the aircraft on a runway as determined using a global positioning system or in any appropriate manner. End of runway position 850 may be the position of a boundary beyond which it is not desirable to bring the aircraft to a stop. In other words, end of runway position 850 may refer to an undesirable position for stopping the aircraft. End of runway position 850 may be identified from a database of runway information, or in another appropriate manner. End of runway position 850 may take into account a displaced threshold entered by a pilot or other operator of the aircraft. An overrun warning in accordance with an illustrative embodiment may be particularly useful when a runway is shortened and the risk of overrun is increased.

If it is determined that the stopping distance is greater than the distance remaining, an overrun warning may be provided (operation 852), with the process terminating thereafter. The overrun warning provided may include any appropriate combination of audible alerts, visual alerts, or both audible and visual alerts. If it is determined that the stopping distance is not greater than the distance remaining, process 800 may be repeated with next iteration (operation 854).

Figure 9:
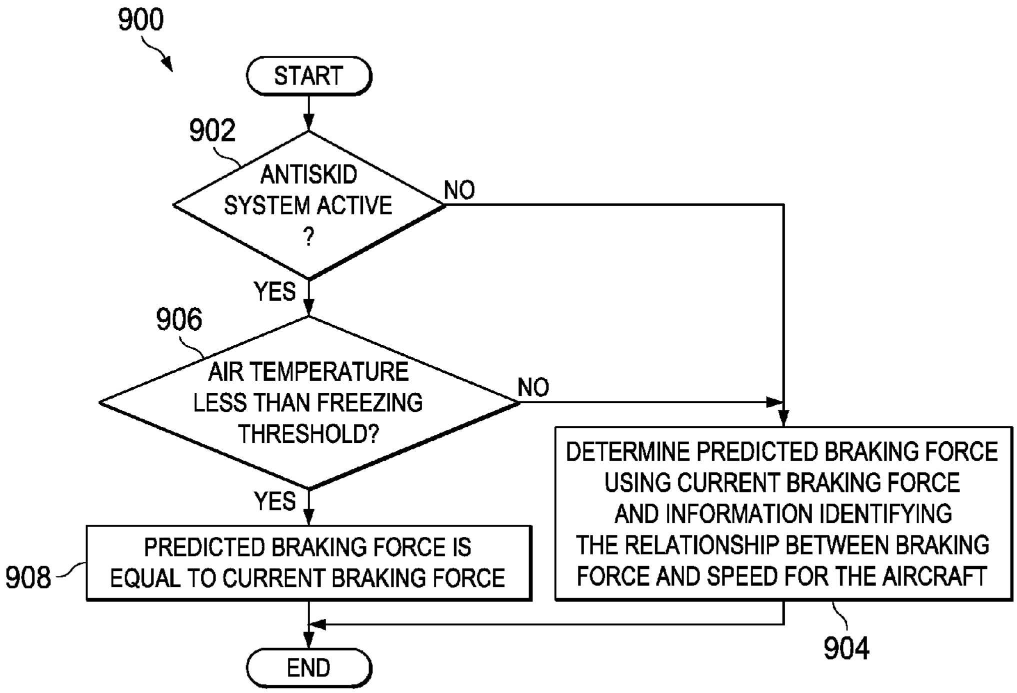
FIG. 9 is an illustration of a flowchart of a process for determining predicted braking force in accordance with an illustrative embodiment.

Turning to FIG. 9, an illustration of a block diagram of a process for determining predicted braking force is depicted in accordance with an illustrative embodiment. Process 900 may be an example of one implementation of a portion of a process for using runway condition information 818 in combination with a determined current braking force and information identifying a relationship between braking force and speed 816 to determine a predicted braking force at a particular speed of an aircraft moving on a runway at operation 814 in FIG. 8.

Runway condition information used in process 900 includes information provided by an antiskid system on an aircraft and air temperature information. Various other types of runway condition information may be used in addition to, or in place of, antiskid system information and air temperature to determine predicted braking force for an aircraft moving on a runway in accordance with an illustrative embodiment. Process 900 is an example of one possible way in which antiskid system information and air temperature information may be used to determine predicted braking force in accordance with an illustrative embodiment. Antiskid system information, air temperature information, other runway condition information, or various combinations of runway condition information may be used to determine predicted braking force for an aircraft moving on a runway in other ways in accordance with an illustrative embodiment.

Process 900 may begin by determining whether the antiskid system on an aircraft is actively controlling the braking of the aircraft (operation 902). If it is determined that the antiskid system is not active, it may be assumed that the aircraft is not in a friction-limited condition. In this case, the predicted braking force for a particular speed of the aircraft moving on the runway may be determined using the current braking force and information identifying the relationship between braking force and speed for the aircraft (operation 904), with the process terminating thereafter.

If it is determined at operation 902 that the antiskid system is actively controlling the braking of the aircraft, it may be determined whether the air temperature is less than a freezing threshold (operation 906). If the antiskid system is determined to be active it may be assumed that the aircraft is in a friction-limited condition. If the aircraft is in a friction-limited condition, it may be assumed that the runway on which the aircraft is moving is icy. However, a determination at operation 906 that the air temperature is not less than a freezing threshold may indicate that the runway is not icy. In this case, the predicted braking force may be determined at operation 904 using the current braking force and information identifying the relationship between braking force and speed, with the process terminating thereafter.

If it is determined at operation 906 that the air temperature is less than the freezing threshold, it may be confirmed that the runway is icy and that the aircraft is friction-limited. In this case, it may be assumed that the braking force is limited to the current braking force and the predicted braking force may be set equal to the current braking force (operation 908), with the process terminating thereafter.

Figure 10:
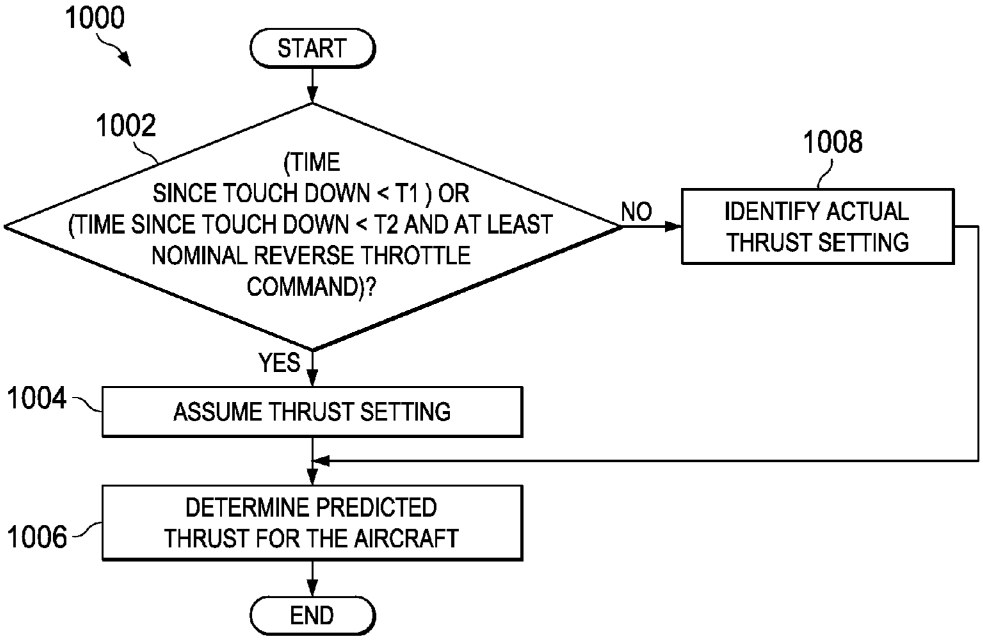
FIG. 10 is an illustration of a flowchart of a process for determining predicted thrust in accordance with an illustrative embodiment.

Turning to FIG. 10, an illustration of a flowchart of a process for determining predicted thrust is depicted in accordance with an illustrative embodiment. In this example, process 1000 may be an example of one implementation of a process for determining predicted thrust 828 in process 800 in FIG. 8. Process 1000 uses assumptions for operation of the thrust system of an aircraft during a landing and actual settings for the thrust system to determine predicted thrust for an aircraft moving on a runway in a manner that may reflect normal operating procedures and prevent nuisance alerts while still accounting for risk factors that may make an overrun more likely, such as delayed reverse thrust usage.

Process 1000 may begin by determining whether the time since the touchdown of an aircraft on a runway is less than a threshold time period T1 or if the time since the touchdown of the aircraft is less than a threshold time period T2 and at least a nominal reverse throttle command is present (operation 1002). Threshold time periods T1 and T2 may be time thresholds of any appropriate duration. For example, without limitation, threshold time periods T1 and T2 may be on the order of a few seconds. Threshold time period T1 may be shorter than threshold time period T2.

In response to a determination that the time since the touchdown of the aircraft is less than the threshold time period T1 or the time since touchdown of the aircraft is less than threshold time period T2 and at least a nominal reverse throttle command is present, a thrust setting may be assumed (operation 1004). For example, the assumed thrust setting may assume that the thrust system will be used in a normal manner to slow down the aircraft moving on the runway. The assumed thrust setting then may be used to determine predicted thrust for the aircraft (operation 1006), with the process terminating thereafter. Otherwise, the actual setting for the thrust system on the aircraft may be identified (operation 1008) and used to determine the predicted thrust at operation 1006, with the process terminating thereafter.

In this example, for a relatively short period of time after touchdown on a runway, predicted thrust may be determined based on the reasonable assumption that the aircraft thrust system will be used to slow down the aircraft, even if the thrust system has not yet been activated for this purpose. This assumption is only used for the short period of time after landing, when there is still time for a warning to be activated if the assumption turns out not to be correct. Use of the assumption may prevent unnecessary warnings from being provided.

Figure 11:
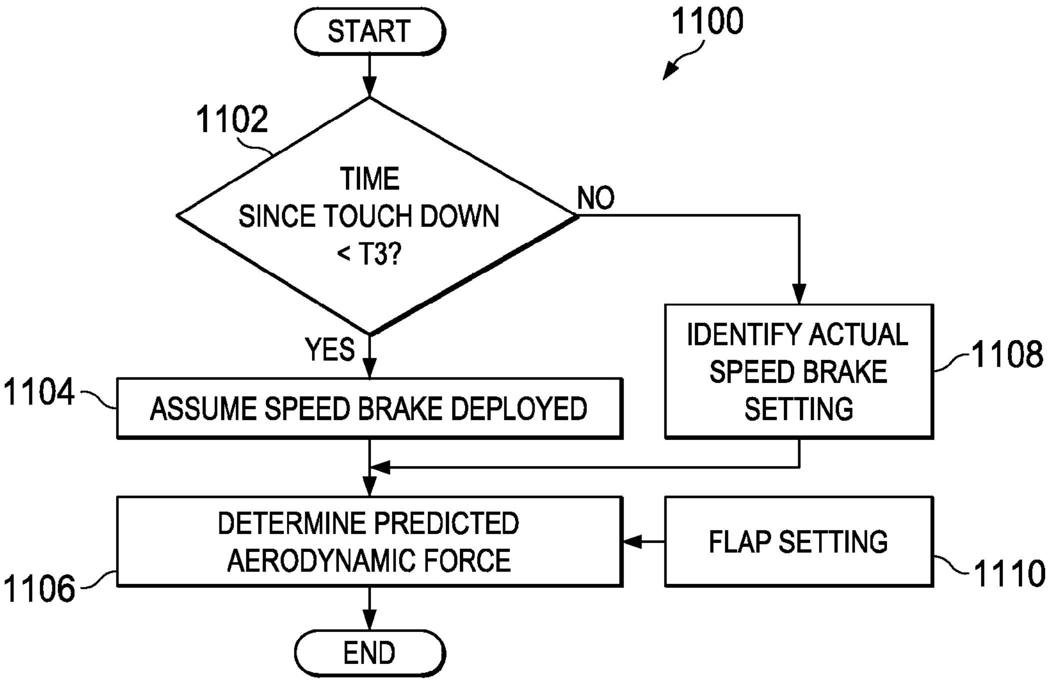
FIG. 11 is an illustration of a flowchart of a process for determining predicted aerodynamic force in accordance with an illustrative embodiment.

Turning to FIG. 11, an illustration of a flowchart of a process for determining predicted aerodynamic force is depicted in accordance with an illustrative embodiment. In this example, process 1100 may be an example of one implementation of a process for determining predicted aerodynamic force 830 in process 800 in FIG. 8. Process 1100 uses assumptions for operation of the aerodynamic systems of an aircraft during a landing and actual settings for the aerodynamic systems to determine predicted aerodynamic force to stop the aircraft moving on a runway in a manner that may reflect normal operating procedures and prevent nuisance alerts while still accounting for risk factors that may make an overrun more likely, such as delayed deployment of an aircraft speed brake.

Process 1100 may begin by determining whether the time since touchdown of an aircraft on a runway is less than a threshold time period T3 (operation 1102). Threshold time period T3 may be a time threshold of any appropriate duration. For example, without limitation, threshold time period T3 may be on the order of a few seconds.

In response to a determination that the time since touchdown of the aircraft is less than the threshold time period T3, it may be assumed that the aircraft speed brake will be deployed to slow down the aircraft in a normal manner (operation 1104). This assumption then may be used to determine predicted aerodynamic force for stopping the aircraft (operation 1106), with the process terminating thereafter. Otherwise, the actual speed brake setting may be identified (operation 1108) and used to determine the predicted aerodynamic force at operation 1106, with the process terminating thereafter. In any case, flap setting 1110 for the flaps on the aircraft may be used in combination with the assumed or actual speed brake setting to determine the predicted aerodynamic force at operation 1106.

In this example, for a relatively short period of time after touchdown, the predicted aerodynamic force to stop an aircraft moving on a runway may be determined based on the reasonable assumption that the aircraft speed brake will be used to slow down the aircraft, even if the speed brake has not yet been deployed. This assumption is only used for the short period of time after landing, when there is still time for a warning to be activated if the assumption turns out not to be correct. Use of the assumption may prevent unnecessary warnings from being provided.

Figure 12:
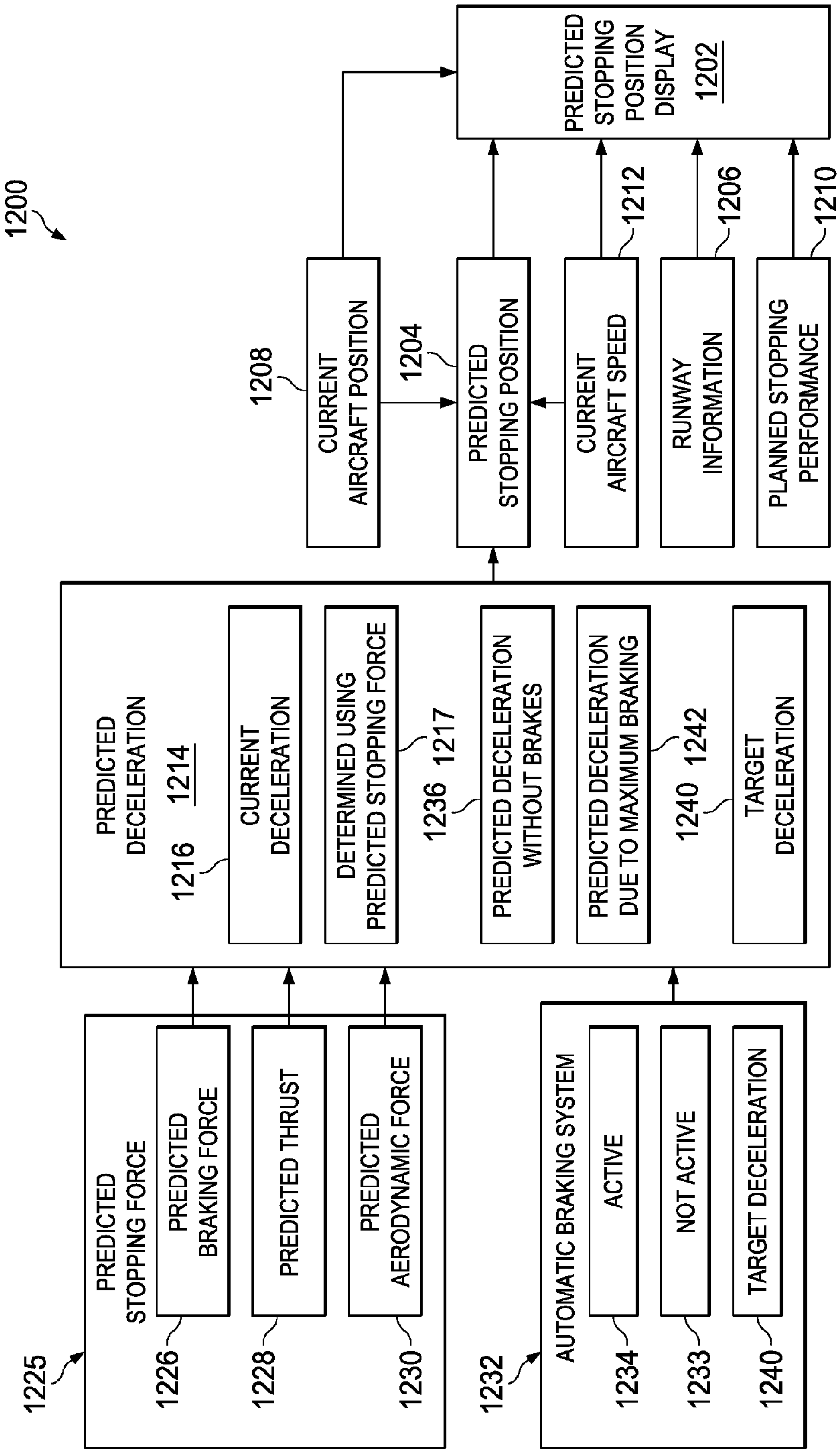
FIG. 12 is an illustration of a block diagram of a stopping performance predictor and predicted stopping position display generator in accordance with an illustrative embodiment.

Turning to FIG. 12, an illustration of a block diagram of a stopping performance predictor and predicted stopping position display generator is depicted in accordance with an illustrative embodiment. In this example, stopping performance predictor and predicted stopping position display generator 1200 may be an example of one implementation of stopping performance predictor 300 and predicted stopping position display generator 304 in FIG. 3. FIG. 12 illustrates relationships between the information that may be used and the calculations that may be performed by stopping performance predictor and predicted stopping position display generator 1200 to provide predicted stopping position display 1202.

Predicted stopping position display 1202 may comprise an indication of predicted stopping position 1204 for an aircraft with respect to a representation of a runway on which the aircraft is moving. Predicted stopping position display 1202 may be generated using predicted stopping position 1204 for the aircraft moving on the runway and runway information 1206. Runway information 1206 may include information identifying various characteristics of the runway on which the aircraft is moving. An indication of current aircraft position 1208 with respect to the runway also may be included in predicted stopping position display 1202.

An indication of planned stopping performance 1210 also may be included in predicted stopping position display 1202. Planned stopping performance 1210 may indicate a plan by the operator of an aircraft for slowing down and stopping the aircraft moving on a runway. Planned stopping performance 1210 may be determined before the aircraft lands on the runway. The indication of planned stopping performance 1210 may be displayed along with the indication of predicted stopping position 1204 in predicted stopping position display 1202 in an appropriate manner to provide for comparison between predicted stopping performance of the aircraft determined as the aircraft is moving on the runway and planned stopping performance 1210.

Predicted stopping position 1204 may be determined using current aircraft position 1208, current aircraft speed 1212, and predicted deceleration 1214 of the aircraft in any appropriate manner. For example, without limitation, predicted deceleration 1214 may be determined for each of a plurality of speeds of an aircraft moving on runway from current aircraft speed 1212 to zero speed.

Predicted deceleration 1214 may be selected to be current deceleration 1216 of the aircraft moving on a runway. Alternatively, predicted deceleration 1214 may be determined using predicted stopping force 1217. Predicted stopping force 1225 may include predicted braking force 1226, predicted thrust 1228, and predicted aerodynamic force 1230. Predicted stopping force 1225 may be determined using runway condition information from various sources. Predicted thrust 1228 may be determined using an appropriate thrust model for an aircraft and appropriate assumptions for operation of the thrust system of an aircraft to stop an aircraft moving on a runway. Predicted aerodynamic force 1230 may be determined using an appropriate aerodynamic model of the aircraft and appropriate assumptions for operation of aerodynamic systems on the aircraft to stop the aircraft moving on a runway.

The setting of automatic braking system 1232 on an aircraft may be used to select predicted deceleration 1214 of the aircraft moving on a runway. For example, without limitation, in response to a determination that automatic braking system 1232 is not active 1233, predicted deceleration 1214 may be set equal to current deceleration 1216 of the aircraft or to a predicted deceleration determined using predicted stopping force 1217. If automatic braking system 1232 is active 1234, predicted deceleration 1214 may be set equal to predicted deceleration without brakes 1236 if predicted deceleration without brakes 1236 is greater than or equal to target deceleration 1240 of automatic braking system 1232. For example, predicted deceleration without brakes 1236 may be determined using predicted thrust 1228 and predicted aerodynamic force 1230 for stopping the aircraft. If automatic braking system 1232 is active 1234, predicted deceleration 1214 may be set equal to predicted deceleration due to maximum braking 1242 if predicted deceleration due to maximum braking 1242 is less than target deceleration 1240 of automatic braking system 1232. For example, predicted deceleration due to maximum braking 1242 may be determined using predicted braking force 1226, predicted thrust 1228, and predicted aerodynamic force 1230 for stopping the aircraft. Otherwise, if automatic braking system 1232 is active 1234, predicted deceleration 1214 may be set equal to target deceleration 1240 of automatic braking system 1232.

Figure 13:
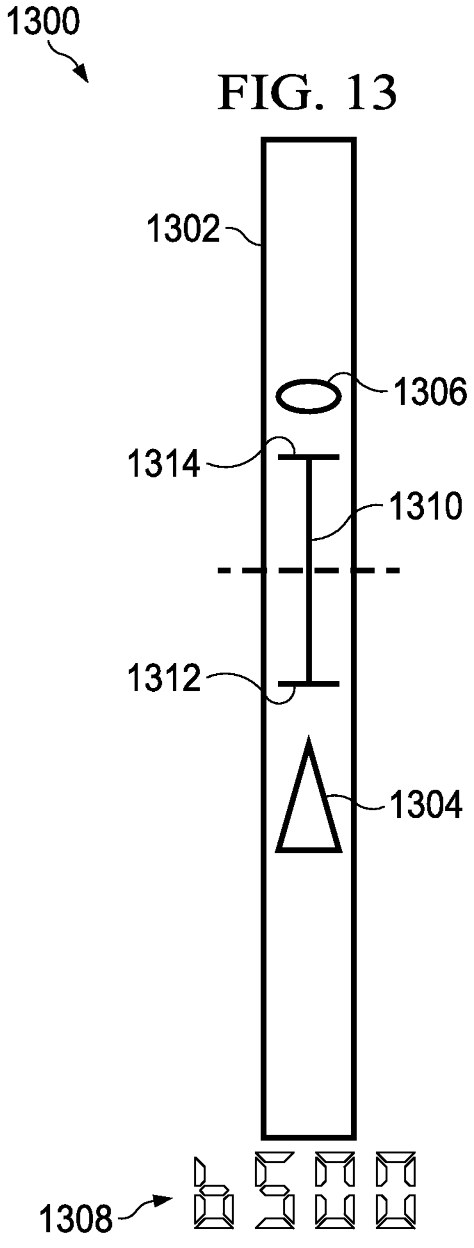
FIG. 13 is an illustration of a predicted stopping position display in accordance with an illustrative embodiment.

Turning to FIG. 13, an illustration of a predicted stopping position display is depicted in accordance with an illustrative embodiment. Predicted stopping position display 1300 may be an example of one implementation of predicted stopping position display 312 in FIG. 3 or of predicted stopping position display 1202 in FIG. 12.

Predicted stopping position display 1300 may include graphical representation of runway 1302. Indicator 1304 may indicate the current position of the aircraft with respect to the runway. Indicator 1306 may indicate the predicted stopping position of the aircraft with respect to the runway. The distance remaining from the current position of the aircraft to the end of the runway also may be displayed in numerical form 1308.

Predicted stopping position display 1300 may be enhanced in an appropriate manner to draw the attention of the flight crew or other operator of an aircraft when the predicted stopping position of the aircraft is beyond the end of the runway. In this case, indicator 1306 may be positioned at or just beyond the end of graphical representation of runway 1302. Indicator 1306 may be flashed on and off or a different color may be used for indicator 1306 when the predicted stopping position for the aircraft is beyond the end of the runway.

Planned stopping performance indicator 1310 may be used to indicate planned stopping performance of the aircraft with respect to the runway. Planned stopping performance indicator 1310 may indicate a range for the planned stopping performance between first end 1312 and second end 1314 of planned stopping performance indicator 1310. First end 1312 and second end 1314 of planned stopping performance indicator 1310 may correspond to planned stopping performance of an aircraft for different surface friction levels corresponding to different runway conditions. Runway conditions corresponding to first end 1312 and second end 1314 of planned stopping performance indicator 1310, and the positions thereof with respect to graphical representation of runway 1302 in predicted stopping position display 1300, may be established by default specification or selected by the pilot or other operator of the aircraft.

In the present example, without limitation, first end 1312 of planned stopping performance indicator 1310 may indicate planned stopping performance for a dry runway. Second end 1314 of planned stopping performance indicator 1310 may indicate planned stopping performance for a wet runway. In the present example, the position of predicted stopping position indicator 1306 is further along graphical representation of runway 1302 than second end 1314 of planned stopping performance indicator 1310. Therefore, in this case, predicted stopping position display 1300 may indicate that the predicted ability of the aircraft to stop on the runway is less than the planned ability to stop on the runway when the runway is wet.

Figure 14:
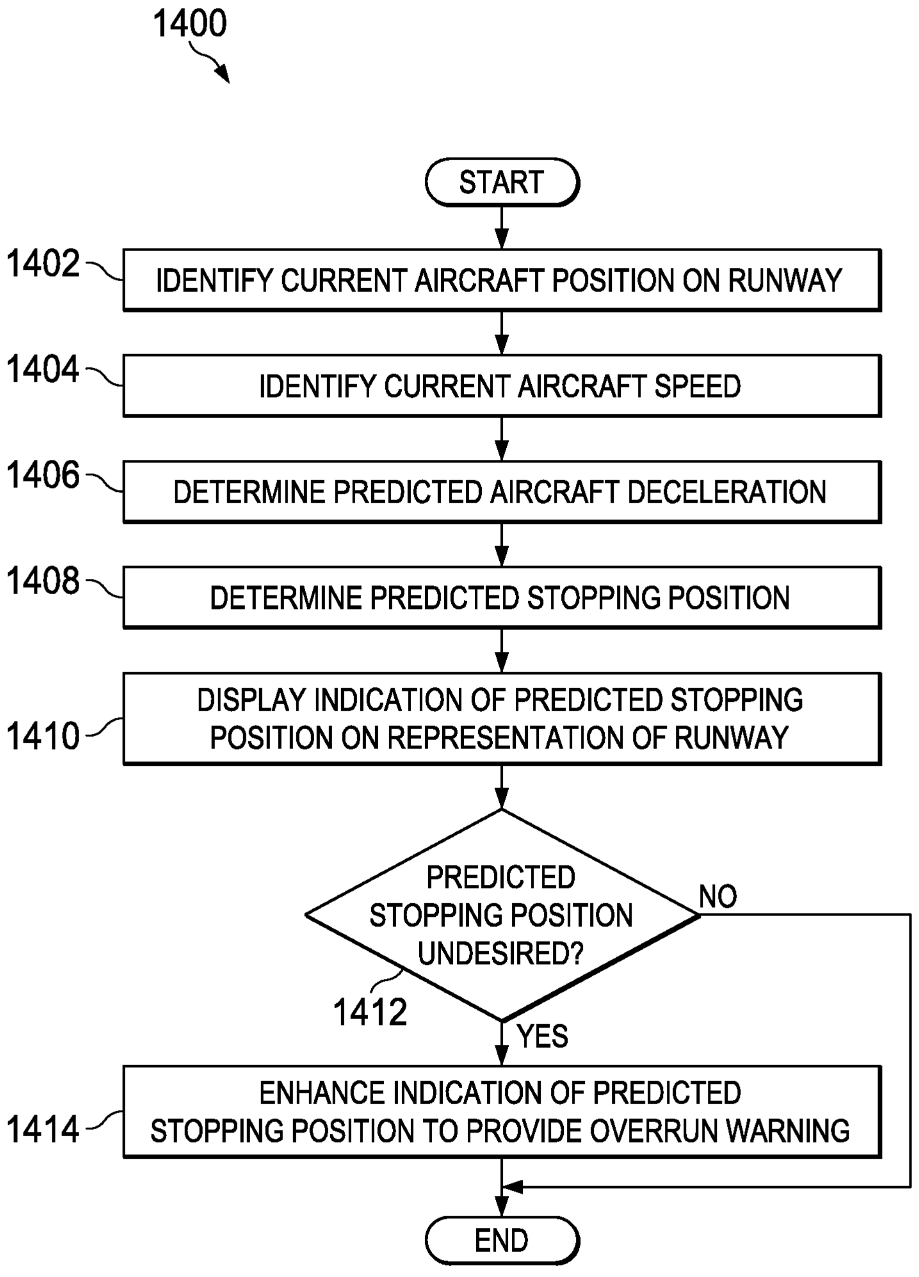
FIG. 14 is an illustration of a flowchart of a process for generating a predicted stopping position display in accordance with an illustrative embodiment.

Turning to FIG. 14, an illustration of a flowchart of a process for generating a predicted stopping position display is depicted in accordance with an illustrative embodiment. In this example, process 1400 may be an example of one implementation of a process implemented in predicted stopping position display generator 304 for generating predicted stopping position display 312 in FIG. 3 or in stopping performance predictor and predicted stopping position display generator 1200 for generating predicted stopping position display 1202 in FIG. 12.

Process 1400 may begin by identifying the current position of an aircraft on a runway (operation 1402). The current speed of the aircraft then may be identified (operation 1404). Predicted deceleration of the aircraft moving on the runway may be determined (operation 1406). The current aircraft position, current aircraft speed, and predicted aircraft deceleration then may be used to determine the predicted stopping position of the aircraft with respect to the runway (operation 1408). An indication of the predicted stopping position of the aircraft then may be displayed on a representation of the runway (operation 1410).

It then may be determined whether the predicted stopping position is an undesired stopping position for the aircraft (operation 1412). For example, a predicted stopping position that is beyond the end of the runway may be an undesired stopping position for the aircraft. In response to a determination that the predicted stopping position is not an undesired stopping position, the process may terminate. Otherwise, the indication of the predicted stopping position may be enhanced to provide a warning (operation 1414), with the process terminating thereafter. For example, without limitation, operation 1414 may include flashing the indication of the predicted stopping position, changing the color of the predicted stopping position, or both.

Figure 15:
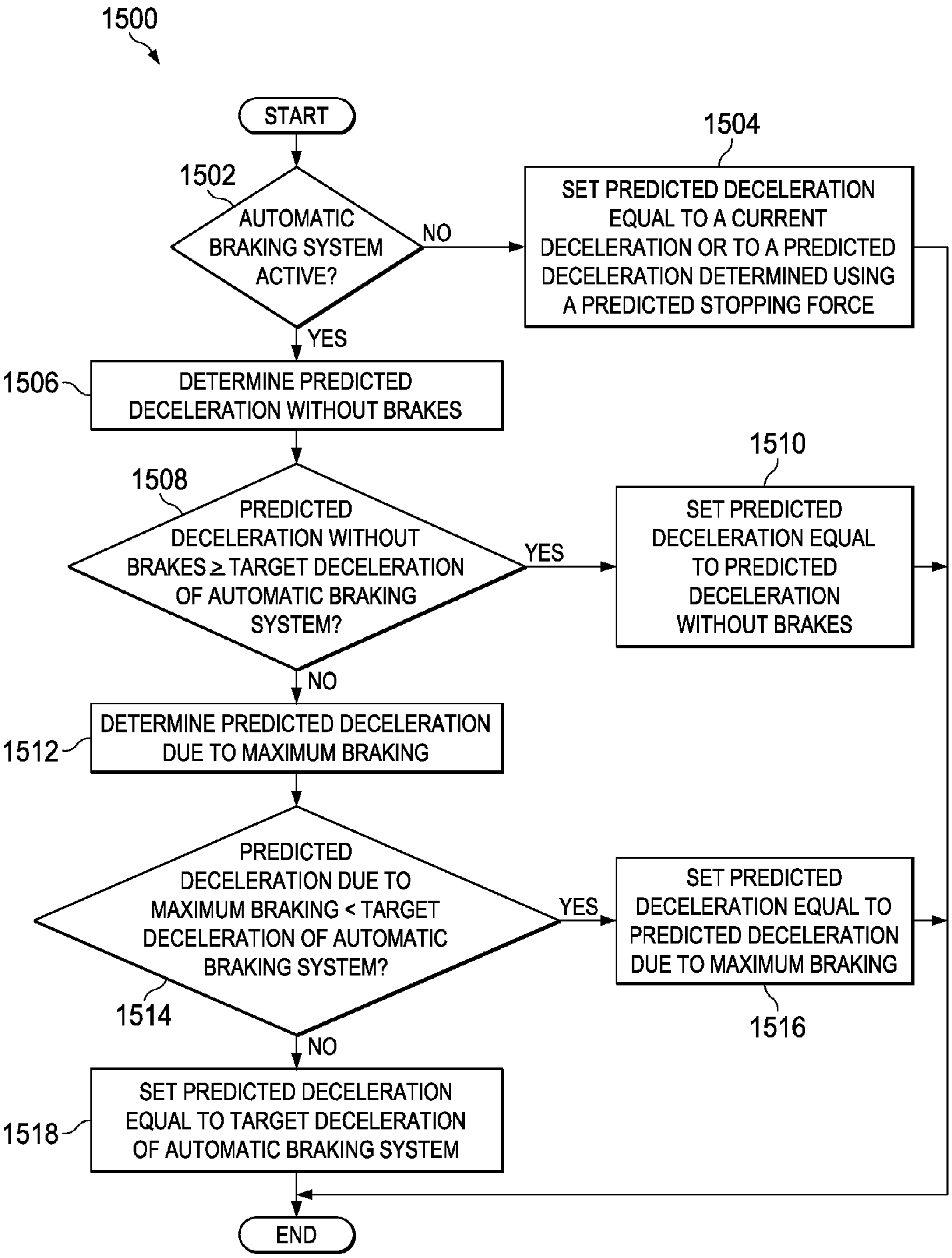
FIG. 15 is an illustration of a flowchart of a process for determining a predicted deceleration of an aircraft in accordance with an illustrative embodiment.

Turning to FIG. 15, an illustration of a flowchart of a process for determining a predicted deceleration of an aircraft is depicted in accordance with an illustrative embodiment. For example, without limitation, process 1500 may be an example of one implementation of a process for operation 1406 in process 1400 in FIG. 14.

Process 1500 may begin by determining whether the automatic braking system for an aircraft moving on a runway is active (operation 1502). In response to a determination that the automatic braking system is not active, the predicted deceleration may be set equal to a current deceleration of the aircraft or to a predicted deceleration determined using a predicted stopping force for stopping the aircraft moving on the runway (operation 1504), with the process terminating thereafter.

In response to a determination that the automatic braking system is active, a predicted deceleration without brakes may be determined (operation 1506). For example, the predicted deceleration without brakes may be determined using thrust and aerodynamic models for the aircraft along with assumptions regarding operation of the thrust and aerodynamic systems of an aircraft. It then may be determined whether the predicted deceleration without brakes is greater than or equal to the target deceleration of the automatic braking system (operation 1508). If the predicted deceleration without brakes is greater than or equal to the target deceleration of the automatic braking system, the predicted deceleration may be set equal to the predicted deceleration without brakes (operation 1510), with the process terminating thereafter.

In response to a determination that the predicted deceleration without brakes is not greater than or equal to the target deceleration of the automatic braking system, a predicted deceleration due to maximum braking may be determined (operation 1512). For example, the predicted deceleration due to maximum braking may be determined using predicted braking force, predicted thrust, and predicted aerodynamic force for stopping the aircraft. It then may be determined whether the predicted deceleration due to maximum braking is less than the target deceleration of the automatic braking system (operation 1514). In response to a determination that the predicted deceleration due to maximum braking is less than the target deceleration of the automatic braking system, the predicted deceleration may be set equal to the predicted deceleration due to maximum braking (operation 1516), with the process terminating thereafter.

In response to a determination that the predicted deceleration due to maximum braking is not less than the target deceleration of the automatic braking system, the predicted deceleration may be set equal to the target deceleration of the automatic braking system (operation 1518), with the process terminating thereafter.

Figure 16:
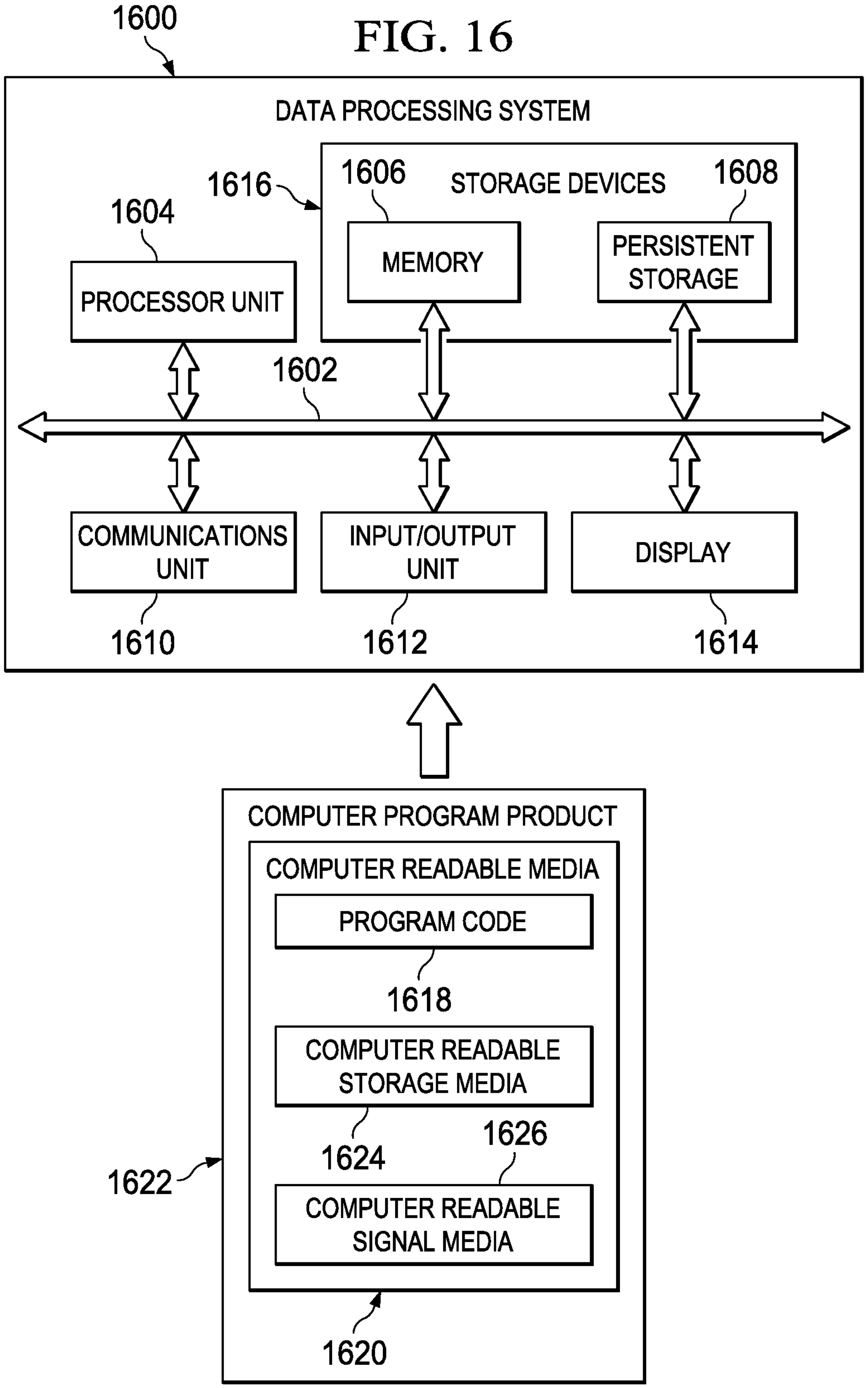
FIG. 16 is an illustration of a block diagram of a data processing system in accordance with an illustrative embodiment.

Turning to FIG. 16, an illustration of a data processing system is depicted in accordance with an illustrative embodiment. Data processing system 1600 may be an example of one implementation of data processing system 285 on which stopping performance predictor 282 in FIG. 2 may be implemented.

In this illustrative example, data processing system 1600 includes communications fabric 1602. Communications fabric 1602 provides communications between processor unit 1604, memory 1606, persistent storage 1608, communications unit 1610, input/output (I/O) unit 1612, and display 1614. Memory 1606, persistent storage 1608, communications unit 1610, input/output (I/O) unit 1612, and display 1614 are examples of resources accessible by processor unit 1604 via communications fabric 1602.

Processor unit 1604 serves to run instructions for software that may be loaded into memory 1606. Processor unit 1604 may be a number of processors, a multi-processor core, or some other type of processor, depending on the particular implementation. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information such as, for example, without limitation, data, program code in functional form, and other suitable information either on a temporary basis or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

Persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different embodiments may be performed by processor unit 1604 using computer-implemented instructions, which may be located in a memory, such as memory 1606.

These instructions may be referred to as program instructions, program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626.

Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

In these examples, computer readable storage media 1624 is a physical or tangible storage device used to store program code 1618 rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different illustrative embodiments may be implemented in a data processing system including components in addition to and/or in place of those illustrated for data processing system 1600. Other components shown in FIG. 16 can be varied from the illustrative examples shown. The different embodiments may be implemented using any hardware device or system capable of running program code. As one example, data processing system 1600 may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1618 may be omitted, because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

In another example, a bus system may be used to implement communications fabric 1602 and may be comprised of one or more buses, such as a system bus or an input/output bus. Of course, the bus system may be implemented using any suitable type of architecture that provides for a transfer of data between different components or devices attached to the bus system.

Additionally, communications unit 1610 may include a number of devices that transmit data, receive data, or transmit and receive data. Communications unit 1610 may be, for example, a modem or a network adapter, two network adapters, or some combination thereof. Further, a memory may be, for example, memory 1606, or a cache, such as found in an interface and memory controller hub that may be present in communications fabric 1602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of illustrative embodiments is presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for determining a predicted stopping performance of an aircraft moving on a runway, comprising:

determining, by a processor unit, a predicted stopping force acting on the aircraft to stop the aircraft as the aircraft is moving on the runway;

determining, by the processor unit, a predicted deceleration of the aircraft moving on the runway using the predicted stopping force acting on the aircraft to stop the aircraft;

determining, by the processor unit, the predicted stopping performance of the aircraft on the runway using the predicted deceleration of the aircraft;

determining a predicted stopping position of the aircraft with respect to the runway using the predicted deceleration of the aircraft; and setting the predicted deceleration of the aircraft equal to a predicted deceleration for the aircraft due to maximum braking in response to a determination that an automatic braking system is active and the predicted deceleration of the aircraft due to maximum braking is less than a target deceleration for the aircraft of the automatic braking system.

2. The method of claim 1, wherein determining the predicted stopping force acting on the aircraft comprises:

determining a predicted braking force provided by a braking system on the aircraft to stop the aircraft;

determining a predicted thrust provided by a number of engines on the aircraft to stop the aircraft; and determining a predicted aerodynamic force provided by an aerodynamic system on the aircraft to stop the aircraft.

3. The method of claim 1, wherein determining the predicted stopping force acting on the aircraft comprises:

identifying runway condition information indicating a condition of the runway; determining a current braking force provided by a braking system on the aircraft to stop the aircraft; and determining a predicted braking force provided by the braking system on the aircraft for each of a plurality of different speeds of the aircraft on the runway using the runway condition information, the current braking force provided by the braking system, and information identifying a relationship between the braking force provided by the braking system on the aircraft and a speed of the aircraft.

4. The method of claim 1, wherein determining the predicted stopping force acting on the aircraft comprises:

in response to a determination that an amount of time since the aircraft touched down on the runway is less than a threshold time period, determining a predicted thrust provided by a number of engines on the aircraft to stop the aircraft using an assumption for operation of a thrust system on the aircraft to provide thrust by the number of engines on the aircraft to stop the aircraft; and in response to a determination that the amount of time since the aircraft touched down on the runway is greater than the threshold time period, determining the predicted thrust provided by the number of engines on the aircraft to stop the aircraft using an actual setting for the thrust system on the aircraft to provide the thrust by the number of engines on the aircraft to stop the aircraft.

5. The method of claim 1, wherein determining the predicted stopping force acting on the aircraft comprises:

in response to a determination that an amount of time since the aircraft touched down on the runway is less than a threshold time period, determining a predicted aerodynamic force provided by an aerodynamic system on the aircraft to stop the aircraft using an assumption for operation of the aerodynamic system on the aircraft to provide aerodynamic force to stop the aircraft; and in response to a determination that the amount of time since the aircraft touched down on the runway is greater than the threshold time period, determining the predicted aerodynamic force provided by the aerodynamic system on the aircraft to stop the aircraft using an actual setting for the aerodynamic system on the aircraft to provide the aerodynamic force to stop the aircraft.

6. The method of claim 1, wherein:

determining the predicted stopping performance of the aircraft on the runway comprises determining a predicted distance to stop for the aircraft using the predicted deceleration of the aircraft; and further comprising:

providing an overrun warning in response to a determination that the predicted distance to stop for the aircraft is greater than a distance remaining from the aircraft to an undesirable position for stopping the aircraft with respect to the runway.

7. The method of claim 6 further comprising:

identifying a length of the runway; and adjusting the predicted distance to stop for the aircraft based on the length of the runway.

8. The method of claim 1, further comprising:

displaying an indication of the predicted stopping position of the aircraft with respect to a representation of the runway.

9. A method for displaying a predicted stopping position of an aircraft moving on a runway, comprising:

identifying, by a processor unit, a current position of the aircraft on the runway;

identifying, by the processor unit, a current speed of the aircraft on the runway;

determining, by the processor unit, a predicted deceleration of the aircraft moving on the runway;

determining, by the processor unit, the predicted stopping position of the aircraft with respect to the runway using the current position of the aircraft, the current speed of the aircraft, and the predicted deceleration of the aircraft;

identifying a planned stopping performance for the aircraft with respect to the runway;

displaying, at a same time, an indication of the predicted stopping position of the aircraft and an indication of the planned stopping performance for the aircraft with respect to a representation of the runway; and setting the predicted deceleration of the aircraft equal to a predicted deceleration for the aircraft due to maximum braking in response to a determination that an automatic braking system is active and the predicted deceleration of the aircraft due to maximum braking is less than a target deceleration for the aircraft of the automatic braking system.

10. The method of claim 9, further comprising:

determining a predicted braking force provided by a braking system on the aircraft to stop the aircraft;

determining a predicted thrust provided by a number of engines on the aircraft to stop the aircraft;

determining a predicted aerodynamic force provided by an aerodynamic system on the aircraft to stop the aircraft; and determining the predicted deceleration of the aircraft using the predicted braking force, the predicted thrust, and the predicted aerodynamic force.

11. The method of claim 10, wherein determining the predicted braking force provided by the braking system on the aircraft comprises:

identifying runway condition information indicating a current condition of the runway;

determining a current braking force provided by the braking system on the aircraft to stop the aircraft; and determining the predicted braking force provided by the braking system on the aircraft for each of a plurality of different speeds of the aircraft on the runway using the runway condition information, the current braking force provided by the braking system, and information identifying a relationship between the braking force provided by the braking system on the aircraft and a speed of the aircraft.

12. The method of claim 9, wherein determining the predicted deceleration of the aircraft moving on the runway comprises:

in response to a determination that the automatic braking system for the aircraft is not active, setting the predicted deceleration of the aircraft equal to a selected one of a current deceleration of the aircraft and a predicted deceleration of the aircraft that is determined using a predicted stopping force acting on the aircraft to stop the aircraft as the aircraft is moving on the runway;

setting the predicted deceleration of the aircraft equal to a predicted deceleration of the aircraft without brakes in response to a determination that the automatic braking system is active and the predicted deceleration of the aircraft without brakes is greater than or equal to the target deceleration for the aircraft of the automatic braking system; and otherwise setting the predicted deceleration of the aircraft equal to the target deceleration for the aircraft of the automatic braking system.

13. An apparatus, comprising:

a stopping force predictor configured to determine a predicted stopping force acting on an aircraft to stop the aircraft as the aircraft is moving on a runway;

a deceleration predictor configured to determine a predicted deceleration of the aircraft moving on the runway using the predicted stopping force acting on the aircraft to stop the aircraft; and a stopping performance predictor configured to:

determine a predicted stopping performance of the aircraft on the runway using the predicted deceleration of the aircraft; and determine a predicted stopping position of the aircraft with respect to the runway using the predicted deceleration of the aircraft;

wherein the predicted deceleration of the aircraft is set equal to a predicted deceleration for the aircraft due to maximum braking in response to a determination that an automatic braking system is active and the predicted deceleration of the aircraft due to maximum braking is less than a target deceleration for the aircraft of the automatic braking system.

14. The apparatus of claim 13, wherein the stopping force predictor is configured to:

determine a predicted braking force provided by a braking system on the aircraft to stop the aircraft;

determine a predicted thrust provided by a number of engines on the aircraft to stop the aircraft; and determine a predicted aerodynamic force provided by an aerodynamic system on the aircraft to stop the aircraft.

15. The apparatus of claim 13, wherein the stopping force predictor is configured to:

identify runway condition information indicating a current condition of the runway;

determine a current braking force provided by a braking system on the aircraft to stop the aircraft; and determine a predicted braking force provided by the braking system on the aircraft for each of a plurality of different speeds of the aircraft on the runway using the runway condition information, the current braking force provided by the braking system, and information identifying a relationship between the braking force provided by the braking system on the aircraft and a speed of the aircraft.

16. The apparatus of claim 13, wherein the stopping force predictor is configured to:

in response to a determination that an amount of time since the aircraft touched down on the runway is less than a threshold time period, determine a predicted thrust provided by a number of engines on the aircraft to stop the aircraft using an assumption for operation of a thrust system on the aircraft to provide thrust by the number of engines on the aircraft to stop the aircraft; and in response to a determination that the amount of time since the aircraft touched down on the runway is greater than the threshold time period, determine the predicted thrust provided by the number of engines on the aircraft to stop the aircraft using an actual setting for the thrust system on the aircraft to provide the thrust by the number of engines on the aircraft to stop the aircraft.

17. The apparatus of claim 13, wherein the stopping force predictor is configured to:

in response to a determination that an amount of time since the aircraft touched down on the runway is less than a threshold time period, determine a predicted aerodynamic force provided by an aerodynamic system on the aircraft to stop the aircraft using an assumption for operation of the aerodynamic system on the aircraft to provide the aerodynamic force to stop the aircraft; and in response to a determination that the amount of time since the aircraft touched down on the runway is greater than the threshold time period, determine the predicted aerodynamic force provided by the aerodynamic system on the aircraft to stop the aircraft using an actual setting for the aerodynamic system on the aircraft to provide the aerodynamic force to stop the aircraft.

18. The apparatus of claim 13, wherein the stopping performance predictor is configured to:

determine a predicted distance to stop for the aircraft using the predicted deceleration of the aircraft; and generate an overrun warning in response to a determination that the predicted distance to stop for the aircraft is greater than a distance remaining from the aircraft to an undesirable position for stopping the aircraft with respect to the runway.

19. The apparatus of claim 18, wherein the stopping performance predictor is further configured to:

identify a length of the runway; and adjust the predicted distance to stop for the aircraft based on the length of the runway.

20. The apparatus of claim 13, wherein the stopping performance predictor is configured to:

generate a predicted stopping position display comprising an indication of the predicted stopping position of the aircraft with respect to a representation of the runway.

* * * * *